(12) United States Patent
Sakaguchi et al.

(10) Patent No.: US 8,557,489 B2
(45) Date of Patent: *Oct. 15, 2013

(54) GALLIUM PHTHALOCYANINE COMPOUND, GALLIUM PHTHALOCYANINE COMPOSITE PIGMENT, METHOD FOR PREPARING GALLIUM PHTHALOCYANINE COMPOSITE PIGMENT, AND ELECTROPHOTOGRAPHIC PHOTOCONDUCTOR

(75) Inventors: Hiromi Sakaguchi, Kanagawa (JP); Masafumi Ohta, Shizuoka (JP); Yoshiki Yanagawa, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 275 days.

This patent is subject to a terminal disclaimer.

(21) Appl. No.: 12/978,787

(22) Filed: Dec. 27, 2010

(65) Prior Publication Data
US 2011/0159420 A1    Jun. 30, 2011

(30) Foreign Application Priority Data

Dec. 28, 2009  (JP) ................... 2009-298564
Dec. 28, 2009  (JP) ................... 2009-298741
Nov. 10, 2010  (JP) ................... 2010-251520

(51) Int. Cl.
*G03G 5/00*    (2006.01)
(52) U.S. Cl.
USPC ............................ 430/82; 540/140
(58) Field of Classification Search
USPC ............................ 540/140; 430/82
See application file for complete search history.

(56) References Cited

FOREIGN PATENT DOCUMENTS

| JP | 5-98181 | 4/1993 |
|---|---|---|
| JP | 5-263007 | 10/1993 |
| JP | 7-53892 | 2/1995 |
| JP | 2009-62475 | 3/2009 |

OTHER PUBLICATIONS

U.S. Appl. No. 12/965,262, filed Dec. 10, 2010, Sakaguchi, et al.

*Primary Examiner* — Mark A Chapman
(74) *Attorney, Agent, or Firm* — Oblon, Spivak, McClelland, Maier & Neustadt, L.L.P.

(57) ABSTRACT

To provide a gallium phthalocyanine compound, which is expressed by the following general formula (I):

General Formula (I)

-continued
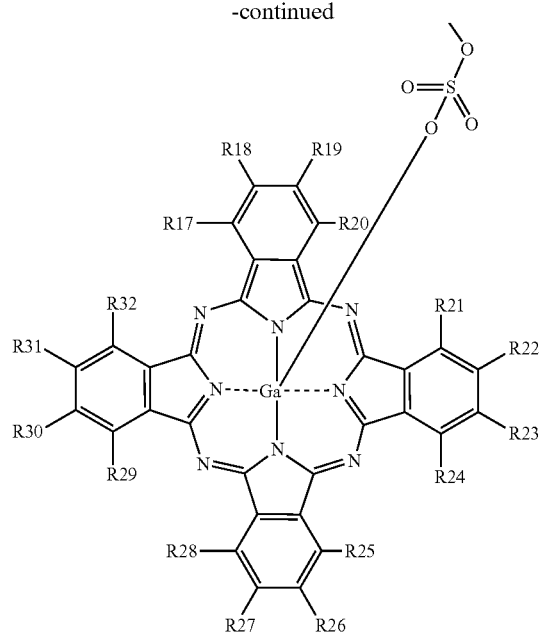
where R1 to R32 are each independently a hydrogen atom, an alkoxy group, an alkylthio group, an alkyl group, a halogen atom, a nitro group, or an aryl group.
6 Claims, 10 Drawing Sheets

GALLIUM PHTHALOCYANINE COMPOUND, GALLIUM PHTHALOCYANINE COMPOSITE PIGMENT, METHOD FOR PREPARING GALLIUM PHTHALOCYANINE COMPOSITE PIGMENT, AND ELECTROPHOTOGRAPHIC PHOTOCONDUCTOR

BACKGROUND OF THE INVENTION

1. Field of the Invention

The present invention relates to a gallium phthalocyanine compound useful for a photosensitive material for electrophotography, a material for a photoelectric conversion element, and a material for an organic semiconductor element, and also relates to a gallium phthalocyanine composite pigment, a method for preparing a gallium phthalocyanine composite pigment, and an electrophotographic photoconductor.

2. Description of the Related Art

A phthalocyanine compound is an effective material widely used as a coating material and an electronic material. In recent years, the phthalocyanine compound has been studied and researched particularly for various applications such as a photosensitive material for electrophotography, a photorecording material, and a material for a photoelectric conversion element. As photosensitive materials for electrophotography, there are numbers of proposals for use of a phthalocyanine compound that has photosensitivity in the near infrared wavelength region of a semiconductor laser. Crystal shapes of the phthalocyanine compound have been intensively studied for improving an electrophotographic photoconductor in terms of both sensitivity and stability during the use of a long period. It has been known that the phthalocyanine compound generally forms various crystal shapes thereof depending on the preparation methods or treating methods, and that the difference in the crystal shapes thereof gives a great influence to photoelectric conversion efficiency of the phthalocyanine compound and stability of the resulting photoconductor in repeated use. For example, in the case of copper phthalocyanine, as crystal shapes of the phthalocyanine compound, other than stable β-type, crystal shapes of α, π, χ, ρ, γ, and δ have been known, and it has been also known that these crystal shapes are interchangeable by the application of external physical force, sulfuric acid treatment, organic solvent treatment, or thermal treatment. The descriptions related to a gallium phthalocyanine compound can be found in Japanese Patent Application Laid-Open (JP-A) Nos. 05-98181, 05-263007, 07-53892, and 2009-62475.

As mentioned above, it has been desired that a charge-generating material used for an electrophotographic photoconductor be highly sensitive in a wide wavelength range, and stably exhibit electrophotographic characteristics. Especially, a phthalocyanine pigment tends to have a problem in dispersibility or a stability of the resulting coating liquid because the phthalocyanine pigment is dispersed at the time of use. It is a current situation that it has not been developed a charge-generating material comprehensively satisfy the aforementioned characteristics.

BRIEF SUMMARY OF THE INVENTION

The prevent invention is made considering the aforementioned situation. An object of the present invention is to provide a novel gallium phthalocyanine compound and a novel gallium phthalocyanine composite pigment, which are effective for realizing high image quality and high stability of electrophotographic devices (e.g. image forming devices such as photocopier, and laser printers), as well as providing a method for preparing such novel gallium phthalocyanine composite pigment, and an electrophotographic photoconductor using such compound or pigment.

Means for solving the aforementioned problems are as follows:

<1> A gallium phthalocyanine compound, which is expressed by the following general formula (I):

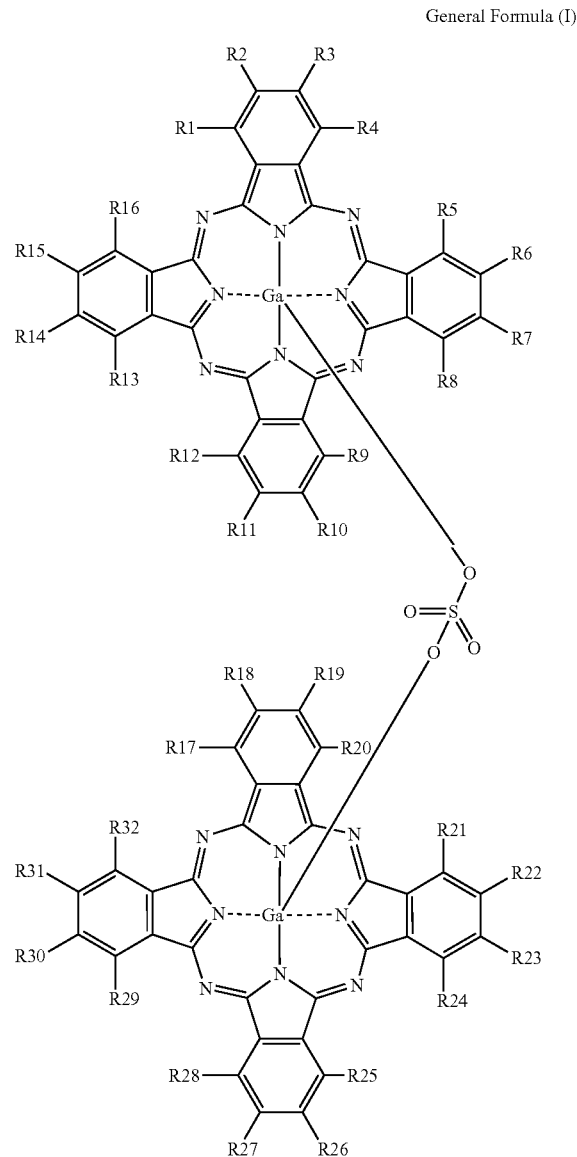

General Formula (I)

where R1 to R32 are each independently a hydrogen atom, an alkoxy group, an alkylthio group, an alkyl group, a halogen atom, a nitro group, or an aryl group.

<2> The gallium phthalocyanine compound according to <1>, wherein the gallium phthalocyanine compound has a diffraction peak at 26.4° to a CuKα X-ray radiation having a wavelength of 0.1541 nm, with Bragg angle being 2θ±0.3°.

<3> The gallium phthalocyanine compound according to <2>, wherein the diffraction peak at 26.4° to a CuKα X-ray radiation having a wavelength of 0.1541 nm with Bragg angle of 2θ±0.3° is the highest peak among peaks present in the range of 2° to 35°.

<4> A gallium phthalocyanine composite pigment, which is a composite pigment formed of a gallium phthalocyanine compound expressed by the general formula (I) and an azo compound expressed by the general formula (a):

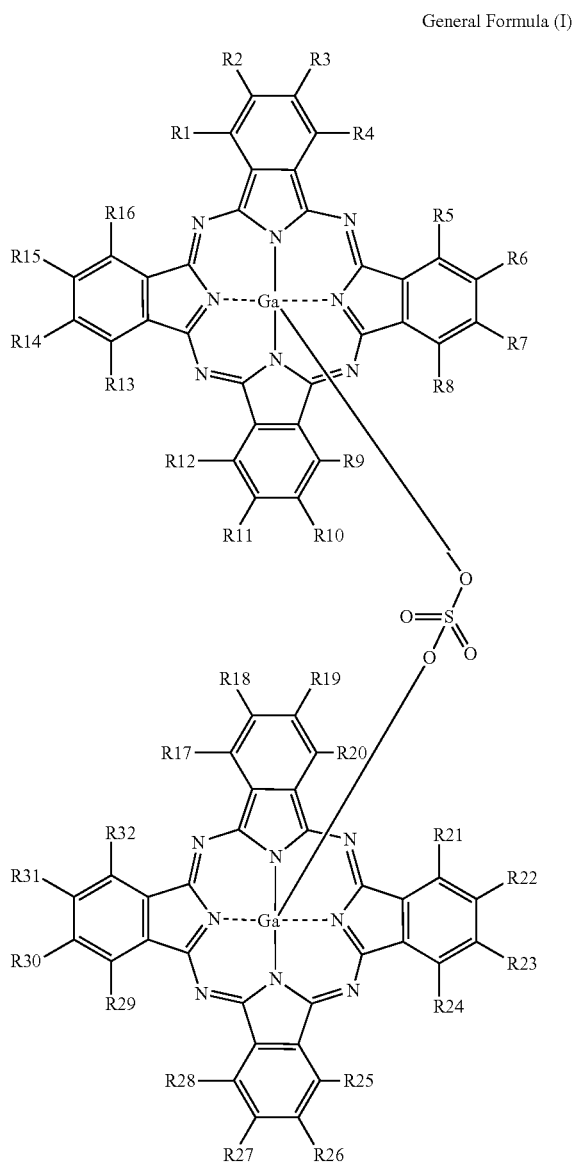

General Formula (I)

where R1 to R32 are each independently a hydrogen atom, an alkoxy group, an alkylthio group, an alkyl group, a halogen atom, a nitro group, or an aryl group, $$A(H)_n \qquad \text{General Formula (a)}$$

where A is a residue of an azo compound; H is a hydrogen atom; the residue A is bonded to one or more hydrogen atoms, where the number of the hydrogen atoms is expressed with n, via one or more hetero atoms which are selected from the group consisting of N and O, and form part of the residue A; and n is an integer of 1 to 9.

<5> The gallium phthalocyanine composite pigment according to <4>, wherein the gallium phthalocyanine composite pigment has a diffraction peak at 26.4° to a CuKα X-ray radiation having a wavelength of 0.1541 nm, with Bragg angle being 2θ±0.3°.

<6> The gallium phthalocyanine composite pigment according to <5>, wherein the diffraction peak at 26.4° to a CuKα X-ray radiation having a wavelength of 0.1541 nm with Bragg angle of 2θ±0.3° is the highest peak among peaks present in the range of 2° to 35°.

<7> A method for preparing the gallium phthalocyanine composite pigment according to <4>, containing:

allowing hydroxygallium phthalocyanine and sulfuric acid to react in an organic solvent so as to prepare a gallium phthalocyanine compound expressed by the following general formula (I), and simultaneously converting an azo compound expressed by the following general formula (II) into an azo compound expressed by the following general formula (a) by a chemical method, a thermal method, or both thereof so as to form the gallium phthalocyanine composite pigment formed of the gallium phthalocyanine compound expressed by the general formula (I) and the azo compound expressed by the general formula (a):

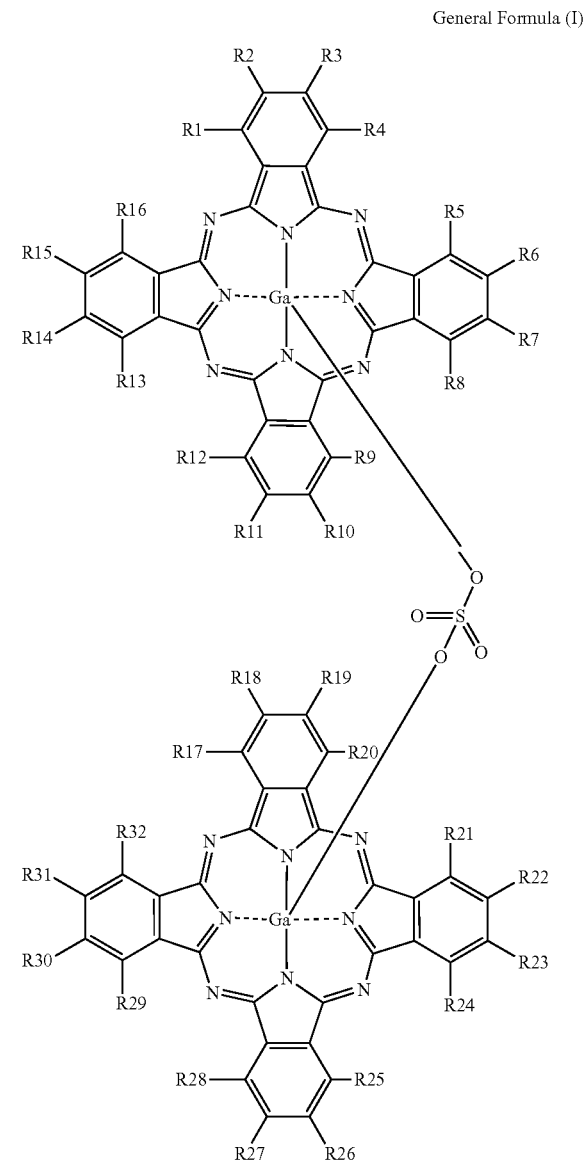

General Formula (I)

where R1 to R32 are each independently a hydrogen atom, an alkoxy group, an alkylthio group, an alkyl group, a halogen atom, a nitro group, or an aryl group, $A(E)_n$  General Formula (II)

where A is a residue of an azo compound, which is bonded to E groups, where the number of the E groups is expressed with n, via one or more hetero atoms which are selected from the group consisting of N and O and form part of the residue A; the E groups are each independently selected from the group consisting of a hydrogen atom and a carboester group expressed by: —C(=O)—O—R1 where R1 is a C4-10 substituted or unsubstituted alkyl group, a C4-10 substituted or unsubstituted alkenyl group, a C4-10 substituted or unsubstituted alkynyl group, a C4-10 substituted or unsubstituted cycloalkyl group, a C4-10 substituted or unsubstituted cycloalkenyl group, or a C4-10 substituted or unsubstituted aralkyl group, provided that there is no case where all of the E groups are hydrogen atoms; and n is an integer of 1 to 9

$A(H)_n$  General Formula (a)

where A is a residue of an azo compound; H is a hydrogen atom; the residue A is bonded to one or more hydrogen atoms, where the number of the hydrogen atoms is expressed with n, via one or more hetero atoms which are selected from the group consisting of N and O, and form part of the residue A; and n is an integer of 1 to 9.

<8> The method according to <7>, wherein the gallium phthalocyanine composite pigment has a diffraction peak at 26.4° to a CuKα X-ray radiation having a wavelength of 0.1541 nm, with Bragg angle being 2θ±0.3°.

<9> The method according to <8>, wherein the diffraction peak at 26.4° to a CuKα X-ray radiation having a wavelength of 0.1541 nm with Bragg angle of 2θ±0.3° is the highest peak among peaks present in the range of 2° to 35°.

<10> A method for preparing the gallium phthalocyanine composite pigment according to <4>, containing:
converting an azo compound expressed by the following general formula (II) into an azo compound expressed by the following general formula (a) by a chemical method, a thermal method, or both thereof in the presence of a gallium phthalocyanine compound expressed by the following general formula (I) so as to form the gallium phthalocyanine composite pigment which is a composite pigment formed of the gallium phthalocyanine compound expressed by the general formula (I) and the azo compound expressed by the general formula (a):

General Formula (I)

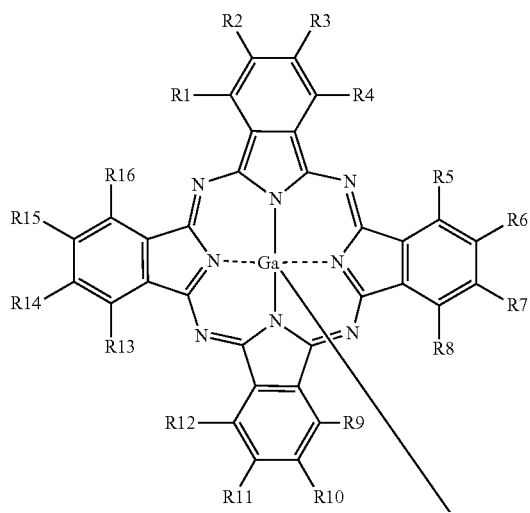

-continued

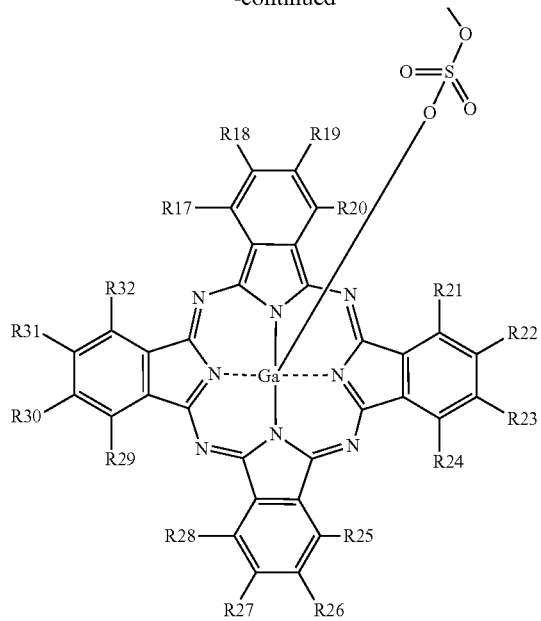

where R1 to R32 are each independently a hydrogen atom, an alkoxy group, an alkylthio group, an alkyl group, a halogen atom, a nitro group, or an aryl group, $A(E)_n$  General Formula (II)

where A is a residue of an azo compound, which is bonded to E groups, where the number of the E groups is expressed with n, via one or more hetero atoms which are selected from the group consisting of N and O and form part of the residue A; the E groups are each independently selected from the group consisting of a hydrogen atom and a carboester group expressed by: —C(=O)—O—R1 where R1 is a C4-10 substituted or unsubstituted alkyl group, a C4-10 substituted or unsubstituted alkenyl group, a C4-10 substituted or unsubstituted alkynyl group, a C4-10 substituted or unsubstituted cycloalkyl group, a C4-10 substituted or unsubstituted cycloalkenyl group, or a C4-10 substituted or unsubstituted aralkyl group, provided that there is no case where all of the E groups are hydrogen atoms; and n is an integer of 1 to 9

$A(H)_n$  General Formula (a)

where A is a residue of an azo compound; H is a hydrogen atom; the residue A is bonded to one or more hydrogen atoms, where the number of the hydrogen atoms is expressed with n, via one or more hetero atoms which are selected from the group consisting of N and O, and form part of the residue A; and n is an integer of 1 to 9.

<11> The method according to <10>, wherein the gallium phthalocyanine composite pigment has a diffraction peak at 26.4° to a CuKα X-ray radiation having a wavelength of 0.1541 nm, with Bragg angle being 2θ±0.3°.

<12> The method according to <11>, wherein the diffraction peak at 26.4° to a CuKα X-ray radiation having a wavelength of 0.1541 nm with Bragg angle of 2θ±0.3° is the highest peak among peaks present in the range of 2° to 35°.

<13> An electrophotographic photoconductor, containing:
a conductive support; and
a photosensitive layer disposed on the conductive support, and containing the gallium phthalocyanine compound according to <1>, wherein the gallium phthalocyanine compound is expressed by the following general formula (I):

General Formula (I)

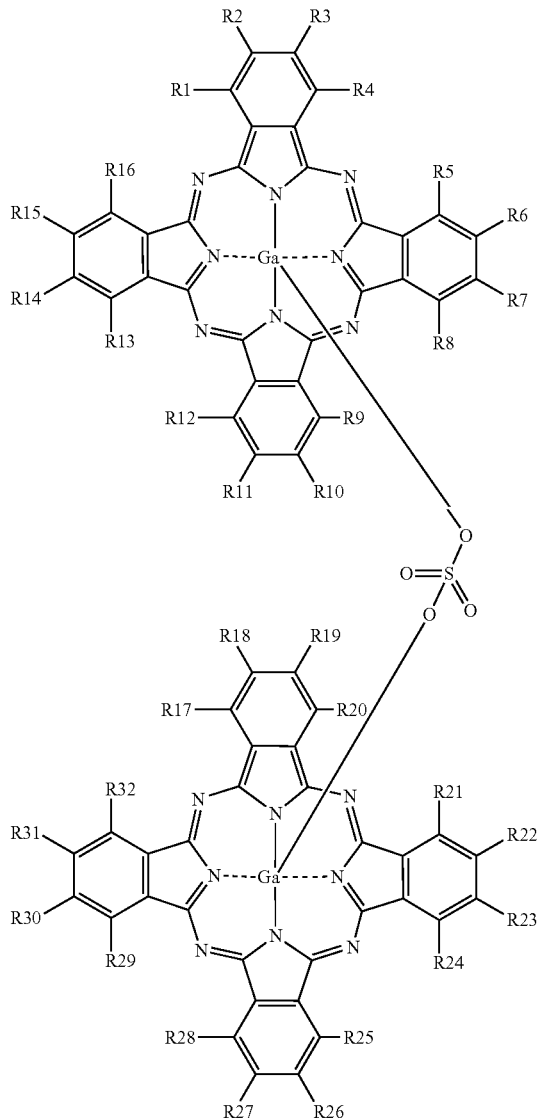

where R1 to R32 are each independently a hydrogen atom, an alkoxy group, an alkylthio group, an alkyl group, a halogen atom, a nitro group, or an aryl group.

<14> The electrophotographic photoconductor according to <13>, wherein the gallium phthalocyanine compound has a diffraction peak at 26.4° to a CuKα X-ray radiation having a wavelength of 0.1541 nm, with Bragg angle being 2θ±0.3°.

<15> The electrophotographic photoconductor according to <14>, wherein the diffraction peak at 26.4° to a CuKα X-ray radiation having a wavelength of 0.1541 nm with Bragg angle of 2θ±0.3° is the highest peak among peaks present in the range of 2° to 35°.

<16> An electrophotographic photoconductor, containing:
a conductive support; and
a photosensitive layer disposed on the conductive support, and containing the gallium phthalocyanine composite pigment according to <4>, wherein the gallium phthalocyanine composite pigment is a composite pigment formed of a gallium phthalocyanine compound expressed by the general formula (I) and an azo compound expressed by the general formula (a):

General Formula (I)

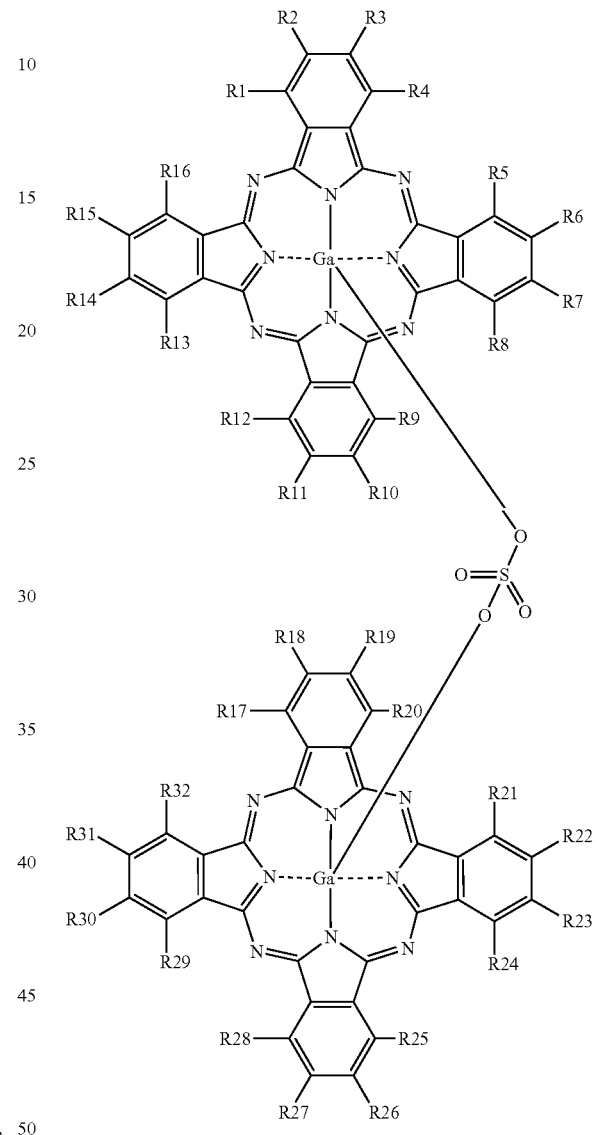

where R1 to R32 are each independently a hydrogen atom, an alkoxy group, an alkylthio group, an alkyl group, a halogen atom, a nitro group, or an aryl group, A(H)$_n$  General Formula (a)

where A is a residue of an azo compound; H is a hydrogen atom; the residue A is bonded to one or more hydrogen atoms, where the number of the hydrogen atoms is expressed with n, via one or more hetero atoms which are selected from the group consisting of N and O, and form part of the residue A; and n is an integer of 1 to 9.

<17> The electrophotographic photoconductor according to <16>, wherein the gallium phthalocyanine composite pigment has a diffraction peak at 26.4° to a CuKα X-ray radiation having a wavelength of 0.1541 nm, with Bragg angle being 2θ±0.3°.

<18> The electrophotographic photoconductor according to <17>, wherein the diffraction peak at 26.4° to a CuKα

X-ray radiation having a wavelength of 0.1541 nm with Bragg angle of 2θ±0.3° is the highest peak among peaks present in the range of 2° to 35°.

<19> An image forming device, containing:
  a charging unit;
  an exposing unit;
  a developing unit;
  a transferring unit; and
  the electrophotographic photoconductor as defined any one of <13> to <18>.

<20> The image forming device according to <19>, wherein the electrophotographic photoconductor and at least one selected from the group consisting of the charging unit, the exposing unit, the developing unit, transferring unit, and a cleaning unit are integratedly formed into a cartridge, and the cartridge is detachably mounted to a body of the image forming device.

<21> A process cartridge for an image forming device, containing:
  the electrophotographic photoconductor as defined in any one of <13> to <18>; and
  at least one selected from the group consisting of a charging unit, an exposing unit, a developing unit, a transferring unit, and a cleaning unit, which is integratedly formed into a cartridge with the electrophotographic photoconductor.

The novel gallium phthalocyanine compound expressed by the general formula (I), which is of the present invention, has photosensitivity in the wide wavelength range, and has high photosensitivity especially in the high wavelength range. Moreover, when the gallium phthalocyanine compound of the present invention is used for an electrophotographic photoconductor, the resulting photoconductor has an excellent potential stability over time. In the past, it was often the case that a gallium phthalocyanine, such as hydroxygallium phthalocyanine pigment, generally had a problem in the dispersibility thereof. However, the novel gallium phthalocyanine compound expressed by the general formula (I), which is of the present invention, has excellent dispersibility, and hence the preparation time for preparing a coating liquid thereof is reduced, production efficiency is improved, and there is more freedom in the formulation design of the coating liquid, such as resins for use, or a mixing ratio. Moreover, as the novel gallium phthalocyanine compound of the present invention has excellent dispersion stability, a post-life of the resulting coating liquid is long, and the production cost can be reduced.

Accordingly, the gallium phthalocyanine compound expressed by the general formula (I) of the present invention is very effective as a charge-generating material for use in electrophotographic photoconductors.

Moreover, the novel gallium phthalocyanine composite pigment of the present invention has the state where the gallium phthalocyanine compound expressed by the general formula (I) and the azo compound expressed by the general formula (a) are conjugated at molecular level, and thus the novel gallium phthalocyanine composite pigment of the present invention excels because it can exhibit the effect of the composition to the maximum extent due to the synergistic effect. As a technique for forming composite pigments and mixing pigments, there are various techniques for mixing a plurality of pigments while milling them. However, these techniques are for mixing pigment particles, and do not form sufficient conjugated states of the pigments. Moreover, there are also techniques for conjugating a soluble electron-donating material to a surface of a pigment serving as a base to form a conjugated state of pigment particles at molecular level, but these techniques have a problem that the electron-donating material is dissolved out when it is dispersed to prepare a coating liquid thereof. However, the novel gallium phthalocyanine composite pigment of the present invention does not have such problem because the soluble azo compound and the gallium phthalocyanine compound expressed by the general formula (I) are formed into a pigment while the azo compound is in contact with the gallium phthalocyanine compound expressed by the general formula (I) at molecular level, and moreover the composite pigment of the present invention can attain the effect obtainable from the conjugation even after the resulting electron-generating layer is formed.

By using the novel gallium phthalocyanine composite pigment of the present invention in a photosensitive layer of an electrophotographic photoconductor, furthermore, the present invention can give a significantly excellent effect that an electrophotographic photoconductor capable of outputting image defect-free high quality prints for long period of time.

Figure 1:
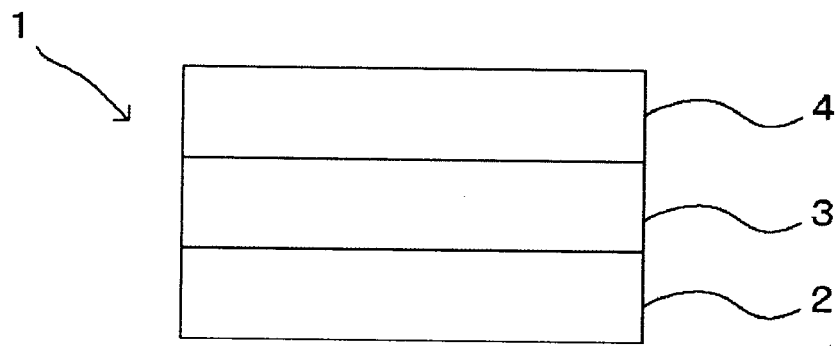
FIG. 1 is a schematic diagram showing one example of the layer structure of the electrophotographic photoconductor of the present invention.

DETAILED DESCRIPTION OF THE INVENTION (Novel Gallium Phthalocyanine Compound)

The gallium phthalocyanine compound of the present invention is a novel compound expressed by the following general formula (I):

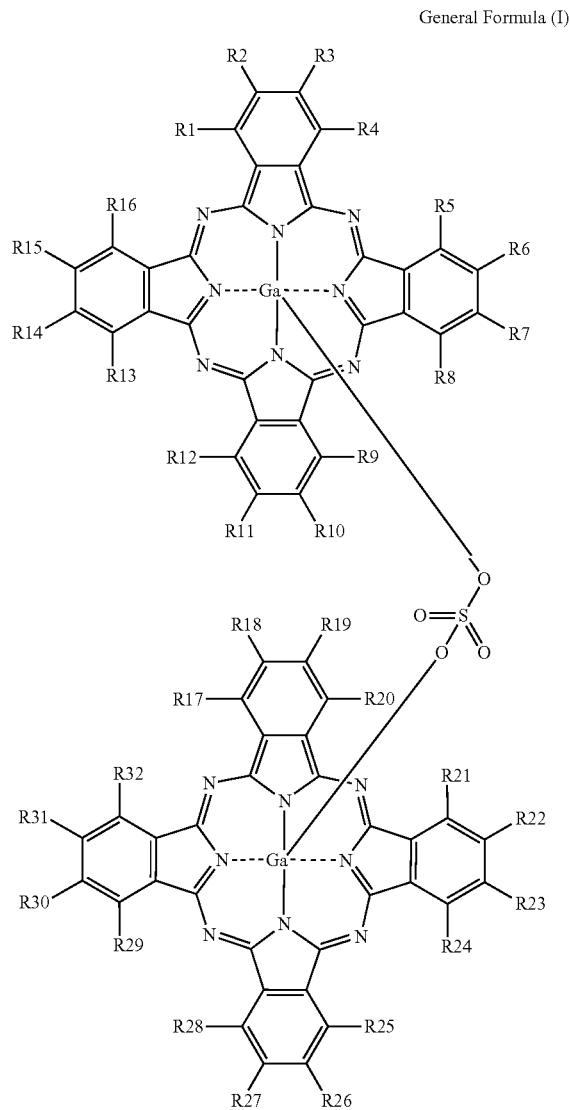

General Formula (I)

In the general formula (I), R1 to R32 are each independently a hydrogen atom, an alkoxy group, an alkylthio group, an alkyl group, a halogen atom, a nitro group, or an aryl group.

The novel gallium phthalocyanine compound can be synthesized, for example, by using as a starting material hydroxygallium phthalocyanine obtainable by hydrolysis of chlorogallium phthalocyanine which can be synthesized by the method for reacting gallium trichloride and diaminoisoindoline as described in D.C. Acad. Sci., (1965), 242, 1026.

The hydrolysis may be acid hydrolysis or alkali hydrolysis.

The acid hydrolysis is for example a method in which chlorogallium phthalocyanine is hydrolyzed using sulfuric acid, as described in Bull. Soc. Chim. France, 23 (1962). The alkali hydrolysis is for example a method for hydrolyzing using ammonium, which is described in Inrog. Chem. (19), 3131, (1980).

Then the obtained hydroxygallium phthalocyanine and sulfuric acid are allowed to react in an organic solvent to thereby synthesize the novel gallium phthalocyanine compound.

The molar ratio of hydroxygallium phthalocyanine and sulfuric acid is suitably ½ moles to 100 moles of sulfuric acid relative to 1 mole of hydroxygallium phthalocyanine.

Examples of the organic solvent for use include dimethylsulfoxide, N,N-dimethylformamide, N,N-dimethylacetoamide, tetrahydrofuran, dioxane, 2-butanone, cyclohexanone, monochlorobenzene, dichlorobenzene, toluene, xylene, anisole, nitrobenzene, ethylene glycol methyl ether, ethylene glycol ethyl ether, ethyl cellosolve, ethyl acetate, butyl acetate, trichloroethane, picoline, and quinoline.

The reaction temperature is suitably selected depending on the intended purpose without any restriction, but is generally 0° C. to 200° C., preferably 20° C. to 150° C.

The duration for the reaction is suitably selected depending on the intended purpose without any restriction, and is for example 30 minutes to 40 hours.

As mentioned earlier, it has been known that the crystal shape of the phthalocyanine compound gives influence to the sensitivity of the resulting electrophotographic photoconductor. The novel gallium phthalocyanine compound preferably has a peak at 26.4° to CuKα X-rays (wavelength: 0.1541 nm) with Bragg angle being $2\theta \pm 0.3°$. Depending on the conditions of the reaction, there is a case where the peak intensity of the peak at 26.4° is the highest among the peaks present in the range from 2° to 35°, and in this case such compound has excellent electrophotographic properties and hence such compound is preferable. In the case where the intensity of the peak present at 26.4° is not the highest among the peaks present the aforementioned range, such compound can be turned into a compound having the diffraction peak at 26.4°, which is the highest among the peaks present in the range of 2° to 35°, to CuKα X-rays (wavelength: 0.1541 nm) with Bragg angle of $2\theta \pm 0.3°$, by treating the compound in a solvent such as N,N-dimethylformamide, and N,N-dimethylacetoamide for 30 minutes to 20 hours at the temperature ranging from room temperature to 200° C. while stirring. Moreover, as such treatment, mechanically pulverizing (e.g. ball milling) such compound using a solvent such as N,N-dimethylformamide, and N,N-dimethylacetoamide is also effective.

The novel gallium phthalocyanine compound of the present invention expressed by the general formula (I), as obtained in the aforementioned manner, can be used in various fields, such as a coloring agent, and a material for electronic devices, but is especially effective as a charge-generating material for electrophotographic photoconductors.

(Novel Gallium Phthalocyanine Composite Pigment)

The novel gallium phthalocyanine composite pigment of the present invention is a complex compound of the gallium phthalocyanine compound expressed by the following general formula (I) and the azo compound expressed by the following general formula (a), and thus naturally a novel pigment.

General Formula (I)

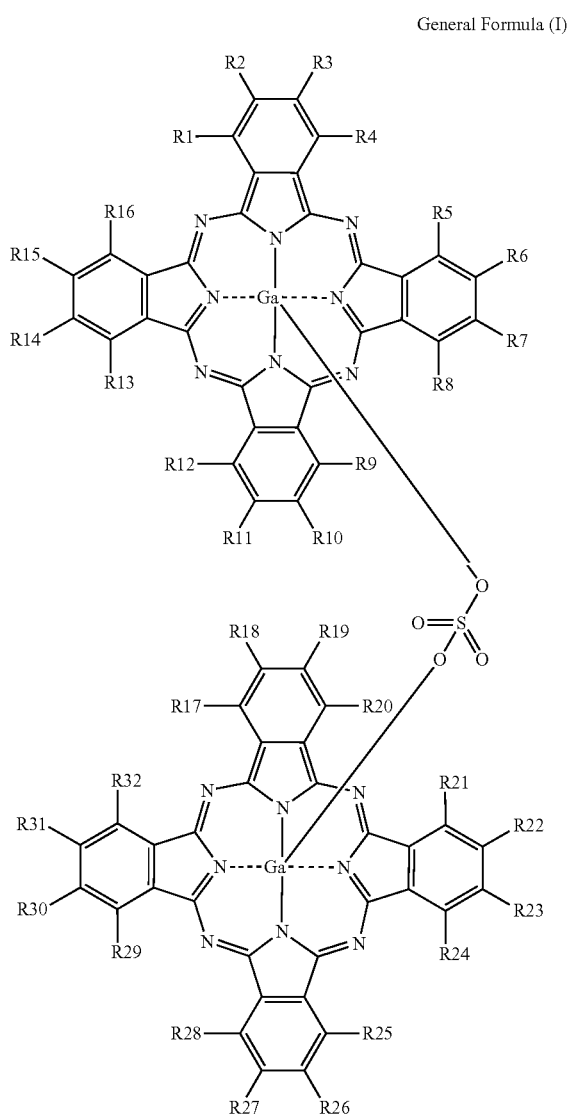

In the general formula (I), R1 to R32 are each independently a hydrogen atom, an alkoxy group, an alkylthio group, an alkyl group, a halogen atom, a nitro group, or an aryl group.

$A(H)_n$          General Formula (a)

In the general formula (a), A is a residue of an azo compound; H is a hydrogen atom; the residue A is bonded to one or more hydrogen atoms, where the number of the hydrogen atoms is expressed with n, via one or more hetero atoms which are selected from the group consisting of N and O, and form part of the residue A; and n is an integer of 1 to 9.

(Method for Preparing Novel Gallium Phthalocyanine Composite Pigment)

The method for preparing a novel gallium phthalocyanine composite pigment of the present invention will be explained hereinafter.

As a first preparation example, the method for preparing the novel gallium phthalocyanine composite pigment, which contains allowing hydroxygallium phthalocyanine and sulfuric acid to react in an organic solvent so as to prepare the gallium phthalocyanine compound expressed by the general formula (I), and simultaneously to the preparation of the gallium phthalocyanine compound converting the azo compound expressed by the following general formula (II) into the azo compound expressed by the following general formula (a) by a chemical method, a thermal method, or both thereof so as to form the gallium phthalocyanine composite pigment formed of the gallium phthalocyanine compound expressed by the general formula (I) and the azo compound expressed by the general formula (a), will be explained.

$A(E)_n$          General Formula (II)

where A is a residue of an azo compound, which is bonded to E groups, where the number of the E groups is expressed with n, via one or more hetero atoms which are selected from the group consisting of N and O and form part of the residue A; the E groups are each independently selected from the group consisting of a hydrogen atom and a carboester group expressed by: —C(=O)—O—R1 where R1 is a C4-10 substituted or unsubstituted alkyl group, a C4-10 substituted or unsubstituted alkenyl group, a C4-10 substituted or unsubstituted alkynyl group, a C4-10 substituted or unsubstituted cycloalkyl group, a C4-10 substituted or unsubstituted cycloalkenyl group, or a C4-10 substituted or unsubstituted aralkyl group, provided that there is no case where all of the E groups are hydrogen atoms; and n is an integer of 1 to 9.

The starting material is, for example, hydroxygallium phthalocyanine obtainable by hydrolysis of chlorogallium phthalocyanine that can be synthesized by the method in which gallium trichloride and diiminoisoindoline are allowed to react to each other for synthesis, as described in D.C. Acad. Sci., (1965), 242, 1026.

The hydrolysis may be acid hydrolysis or alkali hydrolysis.

The acid hydrolysis is for example a method in which chlorogallium phthalocyanine is hydrolyzed using sulfuric acid, as described in Bull. Soc. Chim. France, 23 (1962). The alkali hydrolysis is for example a method for hydrolyzing using ammonium, which is described in Inrog. Chem. (19), 3131, (1980).

The hydroxygallium phthalocyanine obtained in such manner, the azo compound expressed by the general formula (II) obtainable by the method described in JP-A No. 2009-7523, and sulfuric acid are allowed to react in an organic solvent so that the novel gallium phthalocyanine composite pigment of the present invention can be prepared. The molar ratio of the hydroxygallium phthalocyanine and the sulfuric acid is suitably ½ moles to 100 moles of the sulfuric acid relative to 1 mole of the hydroxygallium phthalocyanine.

Examples of the organic solvent for use include dimethylsulfoxide, N,N-dimethylformamide, N,N-dimethylacetoamide, tetrahydrofuran, dioxane, 2-butanone, cyclohexanone, monochlorobenzene, dichlorobenzene, toluene, xylene, anisole, nitrobenzene, ethylene glycol methyl ether, ethylene glycol ethyl ether, ethyl cellosolve, ethyl acetate, butyl acetate, trichloroethane, picoline, and quinoline.

The reaction temperature is suitably selected depending on the intended purpose without any restriction, but it is generally 0° C. to 200° C., preferably 20° C. to 150° C.

The reaction duration is suitably selected depending on the intended purpose without any restriction, and for example, it is 30 minutes to 40 hours.

The hydroxygallium phthalocyanine pigment used here may be those having low crystallinity, which have been subjected to acid paste treatment, or crystal compounds thereof having a diffraction peak at 28.3° to CuKα X-rays (wavelength: 0.1541 nm) with Bragg angle of 2θ±0.3°, which have been subjected to milling treatment in N,N-dimethylformamide.

The mass ratio of the gallium phthalocyanine compound expressed by the general formula (I) and the azo compound expressed by the general formula (a) is arbitrarily adjusted. However, the amount of the azo compound expressed by the general formula (a) is suitably 0.1 parts by mass to 300 parts by mass relative to 100 parts by mass of the gallium phthalocyanine compound as one of the intentions of the present invention is to further enhance the characteristics of the gallium phthalocyanine compound expressed by the general formula (I).

When the amount of the azo compound expressed by the general formula (a) is less than 0.1 parts by mass relative to 100 parts by mass of the gallium phthalocyanine pigment expressed by the general formula (I), the effect obtainable from the conjugation cannot be clearly exhibited. When the amount of the azo compound expressed by the general formula (a) is more than 300 parts by mass, the characteristics of the gallium phthalocyanine pigment expressed by the general formula (I) cannot be sufficiently exhibited.

As a second preparation example, the method for preparing the novel gallium phthalocyanine composite pigment, which contains converting the azo compound expressed by the general formula (II) into the azo compound expressed by the general formula (a) by a chemical method, a thermal method, or both thereof in the presence of the gallium phthalocyanine compound expressed by the following general formula (I) so as to form a gallium phthalocyanine composite pigment which is a composite pigment of the gallium phthalocyanine compound expressed by the general formula (I) and the azo compound expressed by the general formula (a), will be explained.

At first, hydroxygallium phthalocyanine obtained in the aforementioned manner and sulfuric acid are allowed to react in an organic solvent to thereby synthesize the gallium phthalocyanine compound expressed by the general formula (I).

Next, in the presence of the gallium phthalocyanine compound expressed by the general formula (I), the azo compound expressed by the general formula (II) is converted into the azo compound expressed by the general formula (a) by a chemical method, a thermal method, or both thereof.

As the chemical method, there are methods for converting using a catalyst of acid or base. The preferable catalyst is acid, and examples of such acid include acetic acid, trifluoroacetic acid, propionic acid, acrylic acid, benzoic acid, chloric acid, sulfuric acid, boric acid, p-toluene sulfonic acid, and salicylic acid.

As the thermal method, there is for example a method in which heating is performed at 50° C. to 300° C. in the presence of the organic solvent so as to convert the azo compound expressed by the general formula (II) to the azo compound expressed by the general formula (a). Preferably, the reaction is taken place for 30 minutes to 20 hours at 70° C. to 250° C. under atmospheric pressure.

Examples of the organic solvent for use include: ether solvents such as tetrahydrofuran, and dioxane; glycol ether solvents such as ethylene glycol methyl ether, and ethylene glycol ethyl ether; and others such as N,N-dimethylformamide, N,N-dimethylacetoamide, ethyl cellosolve, ethyl acetate, butyl acetate, monochlorobenzene, dichlorobenzene, toluene, xylene, anisole, cyclohexanone, nitrobenzene, pyridine, picoline, and quinoline.

By using the chemical method and the thermal method in combination, the azo compound expressed by the general formula (II) can be more efficiently converted into the azo compound expressed by the general formula (a). By using this combination of the chemical method and the thermal method, the novel gallium phthalocyanine composite pigment of the present invention can be prepared with high yield and high purity.

As mentioned earlier, it has been known that the crystal shape of the phthalocyanine compound gives influence to the sensitivity of the resulting electrophotographic photoconductor. The novel gallium phthalocyanine compound preferably has a peak at 26.4° to CuKα X-rays (wavelength: 0.1541 nm) with Bragg angle being 2θ±0.3°. Depending on the conditions of the reaction, there is a case where a compound of low crystallinity that does not have a main diffraction peak at 26.4° to CuKα X-rays (wavelength: 0.1541 nm) with Bragg angle being 2θ±0.3° is yield, and such compound is not suitable as a material for an electrophotographic photoconductor. In such case, the compound of low crystallinity can be turned into the composite pigment having a main diffraction peak at 26.4° to CuKα X-rays (wavelength: 0.1541 nm) with Bragg angle being 2θ±0.3° by treating the compound in a solvent such as N,N-dimethylformamide, and N,N-dimethylacetoamide for 30 minutes to 20 hours at the temperature ranging from room temperature to 200° C. while stirring. Moreover, as such treatment, mechanically pulverizing (e.g. ball milling) such compound using a solvent such as N,N-dimethylformamide, and N,N-dimethylacetoamide is also effective.

The azo compound preferably used for the present invention is the azo compound expressed by the following general formula (a) and the azo compound in which the residue A of the azo compound expressed by the general formula (I) is expressed by the following general formula (2).

  General Formula (2)

In the general formula (2), B is a principle skeleton of an azo compound, Cp is a residue of a coupler component, and m is an integer of 2 or 3.

In addition, Cp of the general formula (2) is preferably the coupler component residue expressed by at least one of the following general formulae (3) to (11).

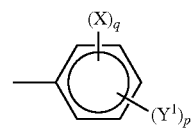

General Formula (3)

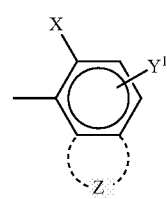

General Formula (4)

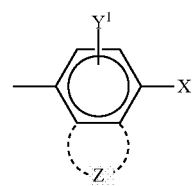

General Formula (5)

General Formula (6)

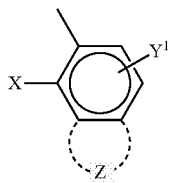

In the general formula (3) to (6) X, Y¹, Z, p and q are each as follows:

X: —OH, —N(R1)(R2), or —NHSO₂—R3, where R1 and R2 are each independently a hydrogen atom, or a substituted or unsubstituted alkyl group, and R3 is a substituted or unsubstituted alkyl group, or a substituted or unsubstituted aryl group, Y¹: a hydrogen atom, a halogen atom, a substituted or unsubstituted alkyl group, a substituted or unsubstituted alkoxy group, a carboxyl group, a sulfone group, a substituted or unsubstituted sulfamoyl group, or —CON(R4)(Y²), where R4 is a hydrogen atom, a substituted or unsubstituted alkyl group, or a substituted or unsubstituted phenyl group; Y² is a substituted or unsubstituted hydrocarbon cyclic group, a substituted or unsubstituted heterocyclic group, or —N=C(R5)(R6), in which R5 is a substituted or unsubstituted hydrocarbon cyclic group, a substituted or unsubstituted heterocyclic group, or a substituted or unsubstituted styryl group, R6 is a hydrogen atom, a substituted or unsubstituted alkyl group, a substituted or unsubstituted phenyl group, or R5 and R6 may form a ring with carbon atoms bonded to R5 and R6, Z: a substituted or unsubstituted hydrocarbon ring, or a substituted or unsubstituted heterocycle, p: an integer of 1 or 2,
q: an integer of 1 or 2.

General Formula (7)

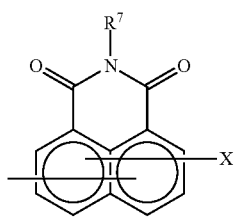

In the general formula (7), R⁷ is a substituted or unsubstituted hydrocarbon group, and X is as explained above.

General Formula (8)

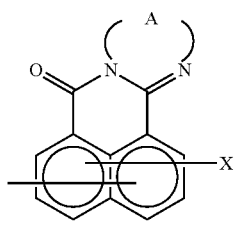

In the general formula (8), A is a hetero atom-containing bivalent group containing either a bivalent aromatic hydrocarbon group or a nitrogen atom, which is necessary for forming a nitrogen-containing heterocycle together with the two nitrogen atoms presented in the formula (8), where the aromatic ring of the bivalent aromatic hydrocarbon group and the heterocycle may be substituted or unsubstituted, and X is as explained above.

General Formula (9)

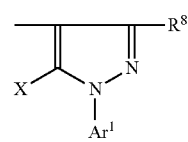

In the general formula (9), R⁸ is an alkyl group, a carbamoyl group, a carboxyl group, or ester thereof, Ar¹ is a substituted or unsubstituted hydrocarbon cyclic group, and X is as explained above.

General Formula (10)

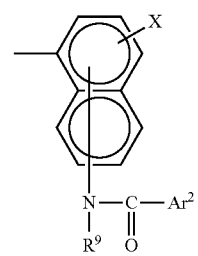

General Formula (11)

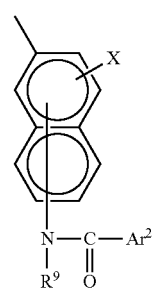

In the general formulae (10) and (11), R⁹ is a hydrogen atom, or a substituted or unsubstituted hydrocarbon group, and Ar² is a substituted or unsubstituted hydrocarbon cyclic group, provided that there is no case where Ar² is a cycloalkyl group, or a cycloalkenyl group with R⁹ being a hydrogen atom.

Moreover, it is preferred that the azo compound expressed by the general formula (2) contain the principal skeleton B expressed by any of the following general formulae (12) to (13). These azo compounds generally exhibit characteristics of n-type, and thus it is very effective for attaining expected effects of the invention, when these are composited with a hydroxygallium phthalocyanine pigment.

General Formula (12)

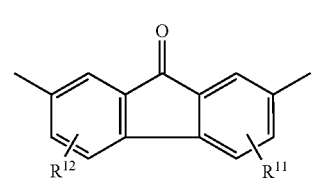

In the formula (12), $R^{11}$ and $R^{12}$ are each independently a hydrogen atom, a halogen atom, a substituted or unsubstituted alkyl group, a substituted or unsubstituted alkoxy group, a carboxyl group, or ester thereof.

General Formula (13)

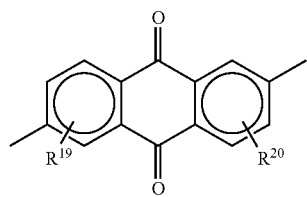

In the formula (13), $R^{19}$ and $R^{20}$ are each independently a hydrogen atom, a halogen atom, a substituted or unsubstituted alkyl group, a substituted or unsubstituted alkoxy group, a carboxyl group or ester thereof.

Preferable examples of the azo compound expressed by the general formulae (a) and (I) for use in the present invention include the azo compounds expressed by the following formulae (12-1) to (12-14) in which the principal skeleton of the azo compound is expressed by the general formula (12), and the azo compounds expressed by (13-1) to (13-5) in which the principal skeleton of the azo compound is expressed by the general formula (13).

Examples of the compound are shown below. In the formulae below, E is a hydrogen atom or a carboester group (—C(=O)—O—R1) where R1 is a C4-10 substituted or unsubstituted alkyl group, alkenyl group, alkynyl group, cycloalkyl group, cycloalkenyl group, or aralkyl group.

<Examples of the Compound where the Principal Skeleton of the Azo Compound is Expressed by General Formula (12)>

(12-1)

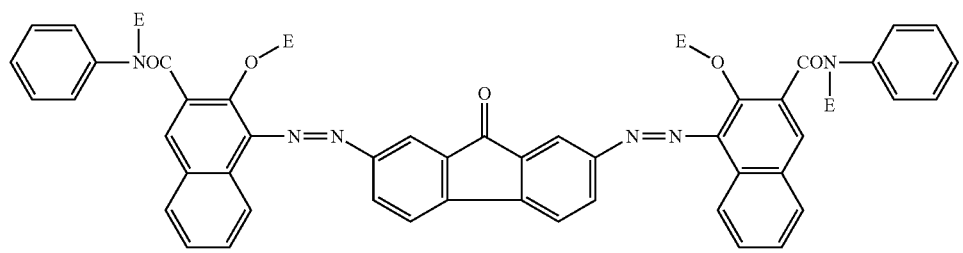

(12-2)

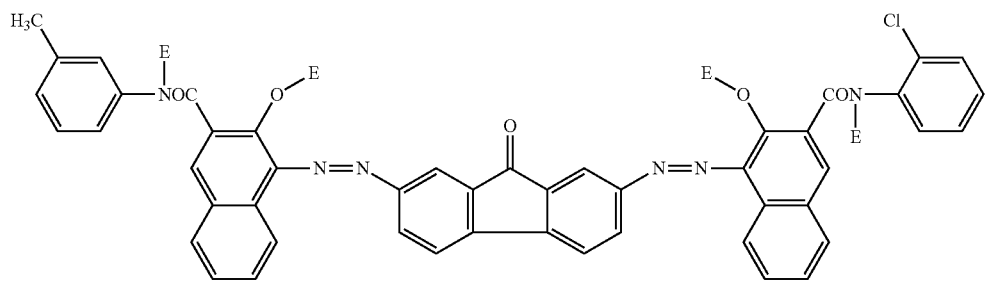

(12-3)

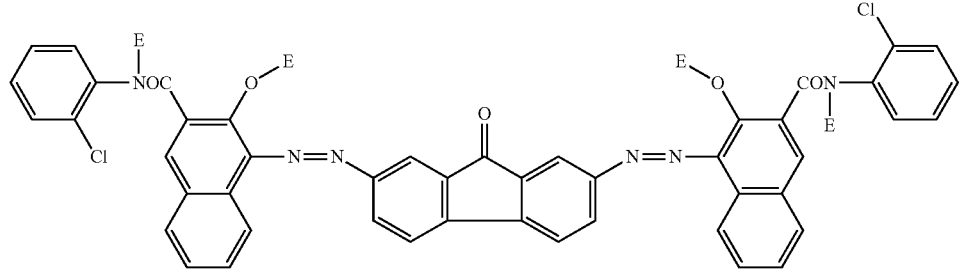

(12-4)

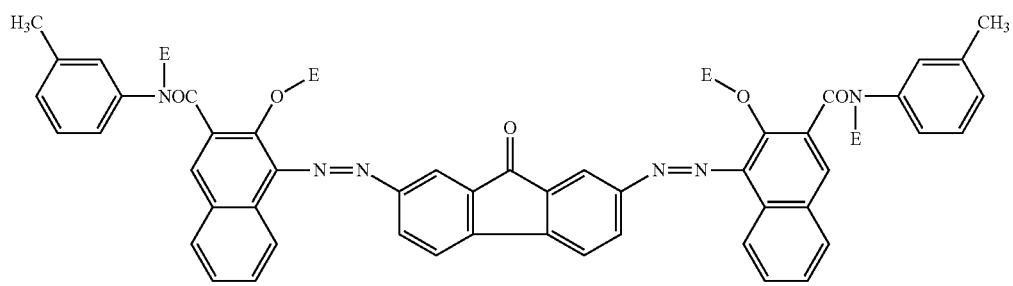

(12-5)
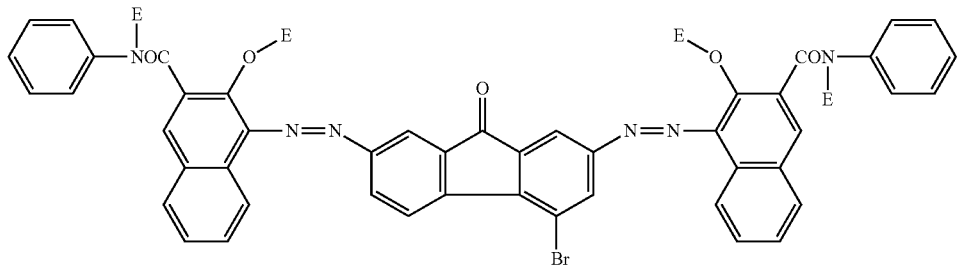
(12-6)
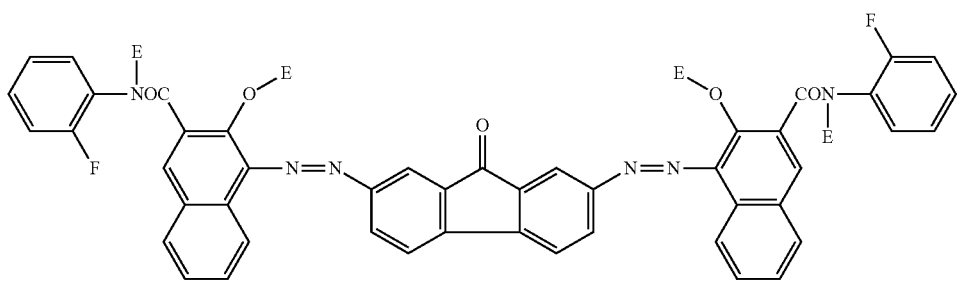
(12-7)
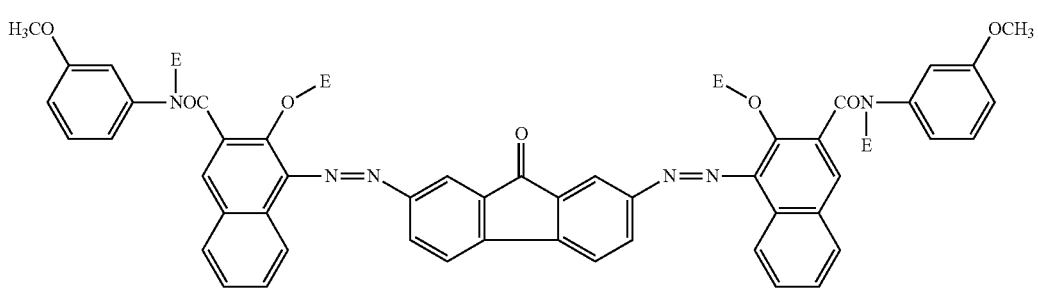
(12-8)
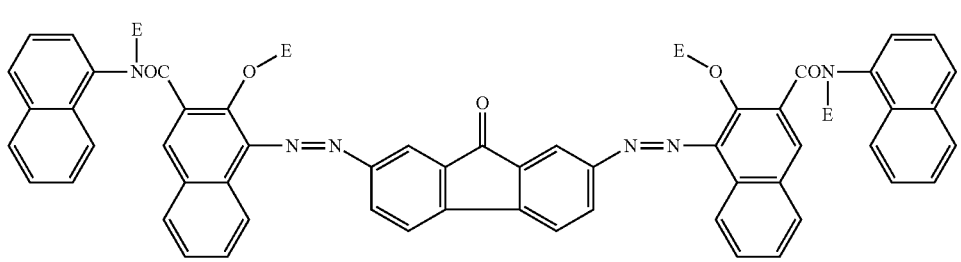
(12-9)
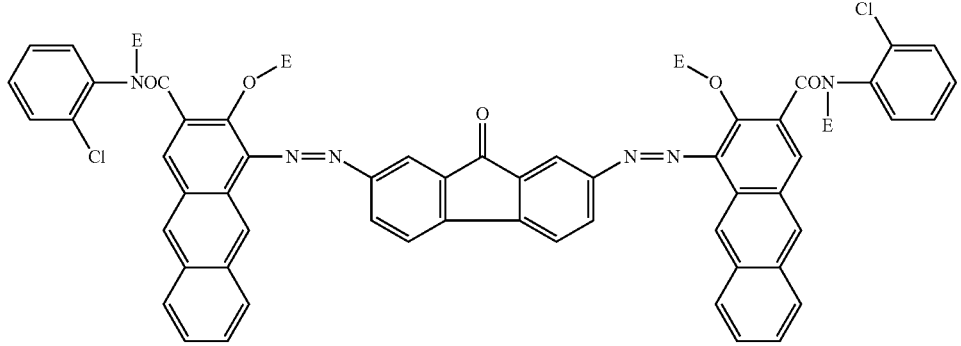

-continued
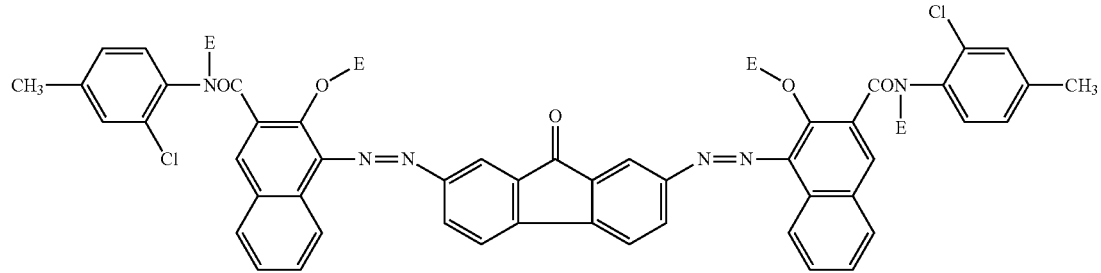
(12-10)
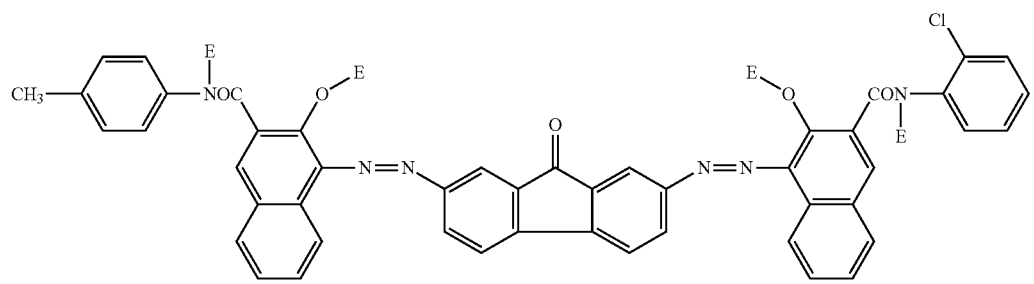
(12-11)
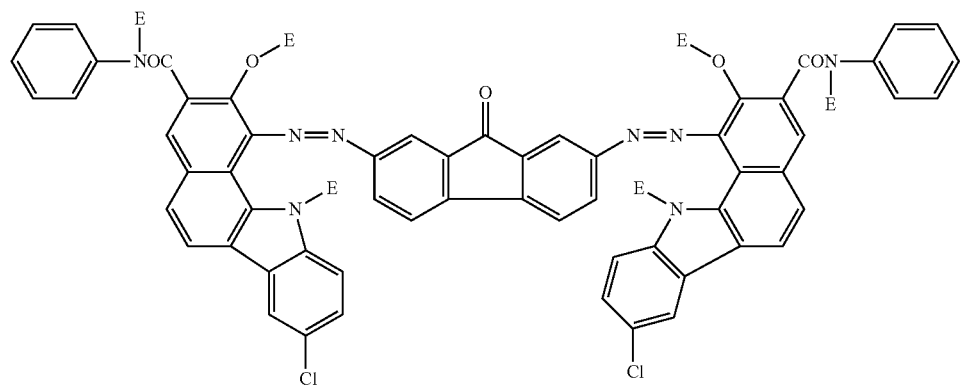
(12-12)
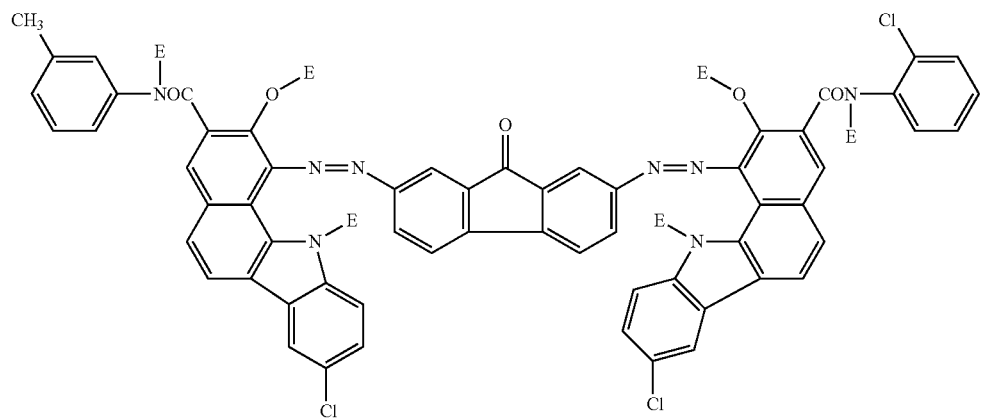
(12-13)

-continued
(12-14)
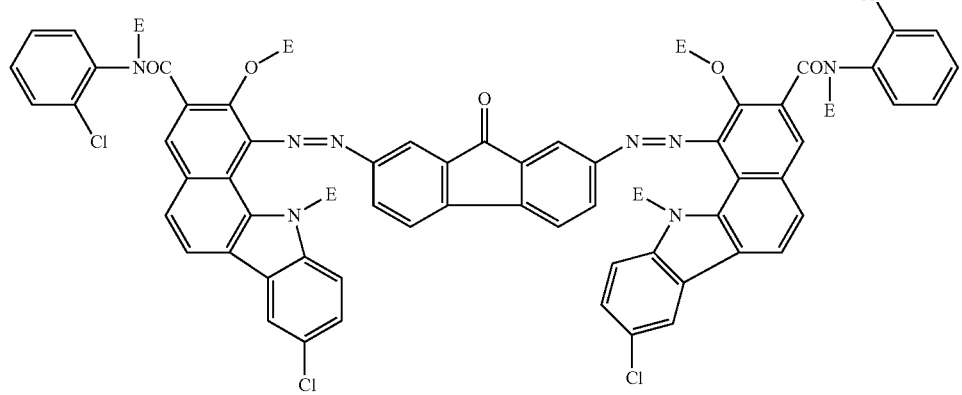
<Examples of the Compound where the Principle Skeleton of the Azo Compound is Expressed by General Formula (13)>
(13-1)
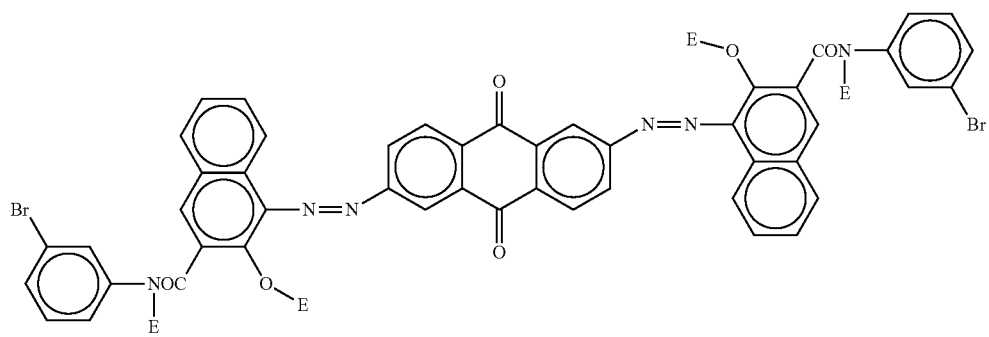
(13-2)
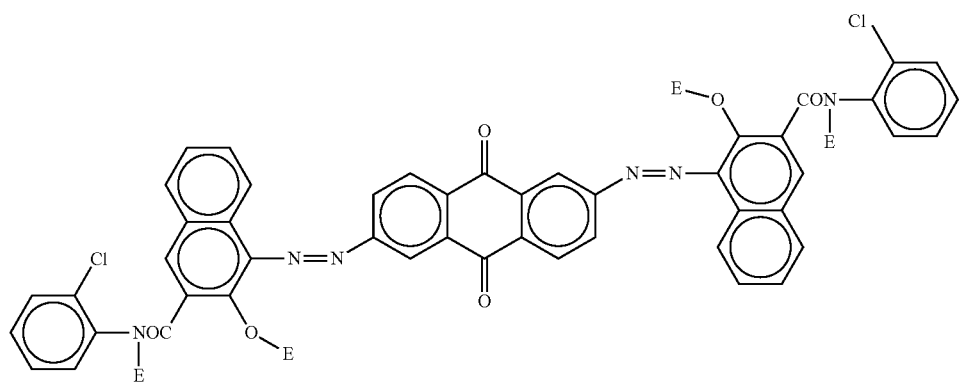
(13-3)
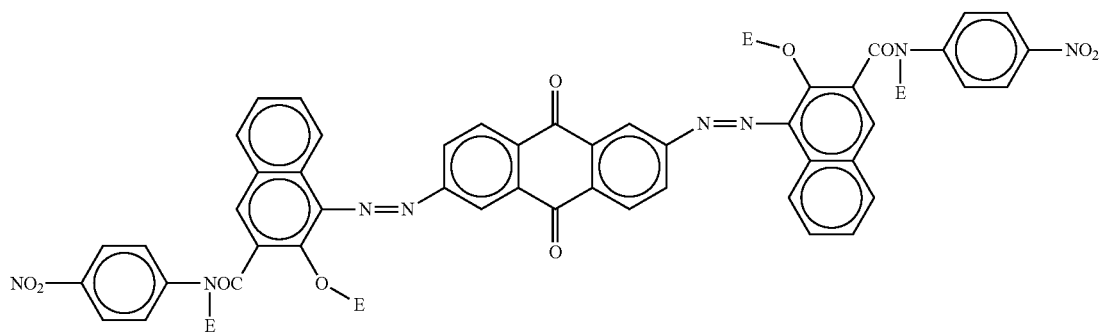

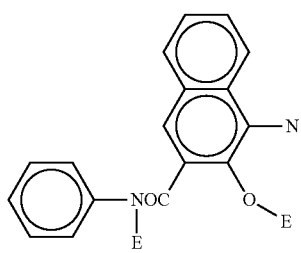
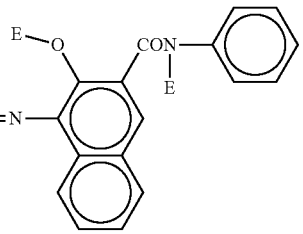

(13-4)

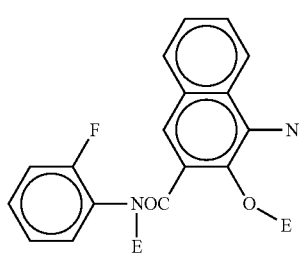
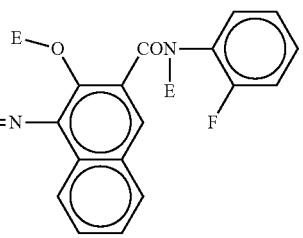

(13-5)

The azo compound expressed by the general formula (I) having the carboester group is, for example, synthesized by the methods described in European Patent Nos. 648770 and 648817, and Japanese Patent Application Publication (JP-A) No. 2001-513119. For example, it can be synthesized by reacting the compound expressed by the general formula (2) and the compound expressed by the following formula (14) (i.e. pyro carbonic acid diester), at an appropriate molar ratio, in an aprotic organic solvent in the presence of a base serving as a catalyst, at the temperature of 0° C. to 150° C., preferably 10° C. to 100° C., for 30 minutes to 20 hours.

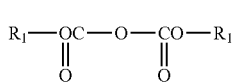

General Formula (14)

In the general formula (14), R1 is identical to R1 explained earlier.

In each case, the molar ratio is affected by the number of the E groups (i.e. carboester groups) to be introduced. It is preferred that the pyro carbonic acid diester is used in a slightly excessive amount.

Examples of the appropriate aprotic organic solvent for use include: ether solvents such as tetrahydrofuran, and dioxane; glycol ether solvents such as ethylene glycol methyl ether, and ethylene glycol ethyl ether; and others such as acetonitril, N,N-dimethylformamide, N,N-dimethylacetoamide, ethyl cellosolve, ethyl acetate, methyl acetate, dichloromethane, dichloroethane, monochlorobenzene, toluene, xylene, nitrobenzene, pyridine, picoline, and quinoline. Among them, pyridine, tetrahydrofuran, N,N-dimethylformamide, and N,N-dimethylacetoamide are preferable.

Examples of the base suitable for the catalyst include: alkali metals such as sodium and potassium; hydroxides and carbonates of alkali metals; alkali metal amide such as sodium amide and potassium amide; and hydrogenated alkali metals such as lithium hydride.

Other examples of the base include organic N-bases such as organic aliphatic N-bases, aromatic N-bases, and heterocyclic N-bases. Examples of the organic N-bases include diazabicyclooctene, diazabicycloundecene, 4-dimethylaminopyridine, dimethylpyridine, pyridine, and triethyl amine. Among them, the organic N-bases such as 4-dimethylaminopyridine, dimethylpyridine, and pyridine are preferable.

The pyrocarbonic acid diester expressed by the formula (14) shown above can be produced by any commonly known method, and can also be obtained as commercial products. R1 denotes those shown above, but is preferably a blanched alkyl group as the result significantly increases the solubility thereof.

(Electrophotographic Photoconductor)

The electrophotographic photoconductor (may also be referred to as a photoconductor, hereinafter) of the present invention contains a conductive support, and at least a photosensitive layer provided on the conductive support, where the photosensitive layer contains at least one selected from the group consisting of the aforementioned gallium phthalocyanine compound and the aforementioned gallium phthalocyanine composite pigment.

Next, the photoconductor of the present invention will be explained with reference to drawings hereinafter.

Figure 2:
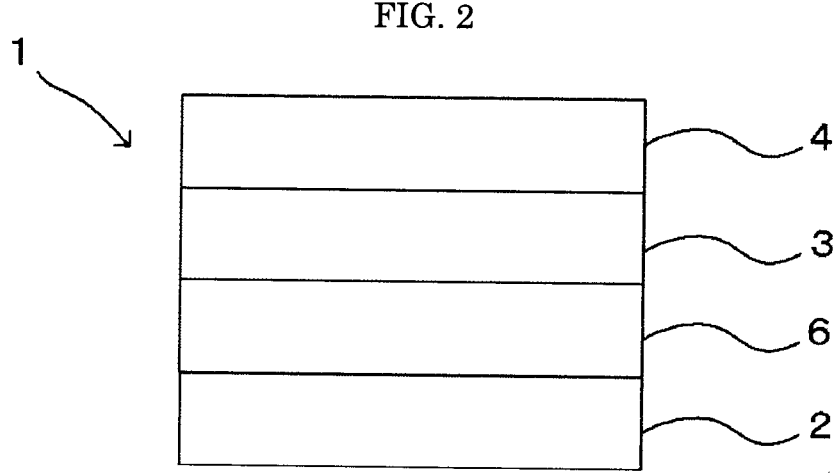
FIG. 2 is a schematic diagram showing another example of the layer structure of the electrophotographic photoconductor of the present invention.

As shown in FIG. 1, one example of the photoconductor (1) of the present invention include a charge-generating layer (3) mainly formed of a charge-generating material, and a charge-transporting layer (4) mainly formed of a charge-transporting material, and a conductive support (2), and the charge-generating layer (3) and the charge-transporting layer (4) are laminated on the conductive support (2). Moreover, one example of the photoconductor (1) of the present invention may have an undercoat layer (6) or an intermediate layer provided between the conductive support (2) and the charge-generating layer (3) as shown in FIG. 2.

Figure 3:
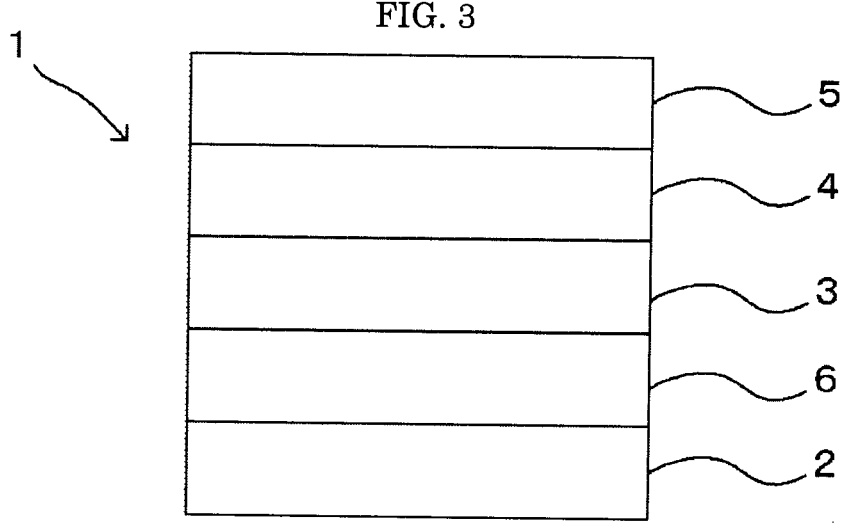
FIG. 3 is a schematic diagram showing another example of the layer structure of the electrophotographic photoconductor of the present invention.

Furthermore, one example of the photoconductor (1) of the present invention may have a protective layer (5) provided on the charge-transporting layer (4) as shown in FIG. 3.

Figure 4:
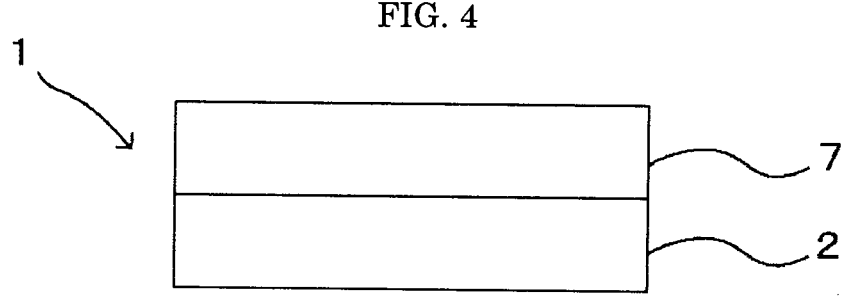
FIG. 4 is a schematic diagram showing another example of the layer structure of the electrophotographic photoconductor of the present invention.

One example of the photoconductor (1) of the present invention may be an embodiment of a single-layer photoconductor in which a single photosensitive layer (7) containing the charge-generating material and the charge-transporting material is provided on the conductive support (2), as shown in FIG. 4.

<Conductive Support>

The conductive support is suitably selected depending on the intended purpose without any restriction, provided that it has a conductivity of $10^{10}$ Ω·cm or less based on the volume resistivity. Examples of the conductive support include: a film-shaped or cylindrical plastic or paper coated with a metal (e.g. aluminum, nickel, chromium, nichrome, copper, gold, silver, platinum) or a metal oxide (e.g. tin oxide, indium oxide) by vacuum deposition or sputtering; and a tube which is formed by forming a tube one or more plates of aluminum, aluminum alloy, nickel, stainless steel into a tube by extrusion, or drawing out, then subjecting the tube to surface treatment such as cutting, super-finishing, and polishing. Moreover, an endless nickel belt, and an endless stainless steel belt can be also used as the conductive support.

Other than the above, those formed by coating a conductive powder, which is dispersed in an appropriate binder resin, onto the aforementioned support can also be used as the conductive support for used in the present invention.

Examples of the conductive powder include: conductive carbon-based powder such as carbon black and acetylene black; metal powder such as aluminum, nickel, iron, nichrome, copper, zinc, and silver; and metal oxide powder such as conductive tin oxide, and ITO.

Examples of the binder resin used together with the conductive powder include thermoplastic resins, thermoset resins, and photocurable resins, and specific examples thereof include polystyrene, styrene-acrylonitrile copolymers, styrene-butadiene copolymers, styrene-maleic anhydride copolymers, polyester, polyvinyl chloride, vinyl chloride-vinyl acetate copolymers, polyvinyl acetate, polyvinylidene chloride, polyacrylate resins, phenoxy resins, polycarbonate, cellulose acetate resins, ethyl cellulose resins, polyvinyl butyral, polyvinyl formal, polyvinyl toluene, poly-N-vinyl carbazole, acrylic resins, silicone resins, epoxy resins, melamine resins, urethane resins, phenol resins, and alkyd resins.

Such conductive layer can be provided by coating a coating liquid prepared by dispersing these conductive powder and binder resin in an appropriate solvent such as tetrahydrofuran, dichloromethane, methylethyl ketone, and toluene.

Moreover, as the conductive support for use in the present invention, those providing a conductive layer on an appropriate cylindrical support using a thermal shrinkable tube in which the aforementioned conductive powder is added to a material such as polyvinyl chloride, polypropylene, polyester, polystyrene, polyvinylidene chloride, polyethylene, chlorinated rubber, and polytetrafluoroethylene-based fluororesin may be also suitably used.

<Photosensitive Layer>

The photosensitive layer will be explained next.

The photosensitive layer having a laminate structure is formed by sequentially laminating at least a charge-generating layer and a charge-transporting layer.

<Charge-Generating Layer>

The charge-generating layer is a layer containing a charge-generating material. The charge-generating layer contains at least the novel gallium phthalocyanine compound or gallium phthalocyanine composite pigment of the present invention as the charge-generating material.

As the charge-generating material, the conventional charge-generating material may be used by mixing with at least the novel novel gallium phthalocyanine compound of the present invention or the novel gallium phthalocyanine composite pigment of the present invention, as long as it does not adversely affect the obtainable effect of the present invention. The amount of the conventional charge-generating material, which will not adversely affect the obtainable effect of the present invention, is suitably selected depending on the intended purpose without any restriction, but it is preferably 95% by mass or less, more preferably 80% by mass or less, and even more preferably 50% by mass or less relative to the total amount of the charge-generating materials. Examples of the conventional charge-generating material include: azo pigments such as monoazo pigments, diazo pigments, asymmetric disazo pigments, and trisazo pigments; phthalocyanine-based pigments such as titanyl phthalocyanine, copper phthalocyanine, vanadyl phthalocyanine, hydroxygallium phthalocyanine, and non-metal phthalocyanine; and others such as perylene-based pigments, perinone-based pigments, indigo pigments, pyrrolo-pyrrole pigments, anthraquinone pigments, quinacridone-based pigments, quinine-based condensed polycyclic compounds, and squarylium pigments.

The mixing ratio of the charge-generating material is suitably selected depending on the intended purpose without any restriction. In the case where the aim is to enhance the characteristics of the novel gallium phthalocyanine compound or novel gallium phthalocyanine composite pigment of the present invention, the amount of the conventional charge-generating material is preferably 0.1 parts by mass to 300 parts by mass relative to 100 parts by mass of the novel gallium phthalocyanine compound or novel gallium phthalocyanine composite pigment of the present invention. When the amount of the conventional charge-generating material is less than 0.1 parts by mass relative to 100 parts by mass of the novel compound or composite pigment of the present invention, the effect obtainable by mixing them cannot be clearly exhibited. When the amount of the conventional charge-generating material is more than 300 parts by mass, the characteristics of the novel gallium phthalocyanine compound or novel gallium phthalocyanine composite pigment of the present invention cannot be sufficiently exhibited. On the other hand, in the case where the aim is to enhance the characteristics of the conventional charge-generating material, the amount of the novel gallium phthalocyanine compound or novel gallium phthalocyanine composite pigment of the present invention is preferably 0.1 parts by mass to 300 parts by mass relative to 100 parts by mass of the conventional charge-generating material. When the amount of the novel compound or composite pigment of the present invention is less than 0.1 parts by mass relative to 100 parts by mass of the conventional charge-generating material, the effect obtainable by mixing them cannot be clearly exhibited. When the amount thereof is more than 300 parts by mass, the characteristics of the conventional charge-generating material cannot be sufficiently exhibited.

Examples of the binder resin for use in the charge-generating layer include polyamide, polyurethane, epoxy resins, polyketone, polycarbonate, silicone resins, acrylic resins, polyvinyl butyral, polyvinyl formal, polyvinyl ketone, polystyrene, polysulfone, poly-N-vinyl carbazole, polyacryl amide, polyvinyl benzal, polyester, phenoxy resins, vinyl chloride-vinyl acetate copolymers, polyvinyl acetate, polyphenylene oxide, polyamide, polyvinyl pyridine, cellulose-based resins, casein, polyvinyl alcohol, and polyvinyl pyrrolidone. The amount of the binder resin is preferably 0 part by mass to 500 parts by mass, more preferably 10 parts by mass to 300 parts by mass, relative to 100 parts by mass of the charge-generating material.

Conventionally, the amount of the pigment contained in the charge-generating layer cannot be increased significantly to secure the dispersion stability and stable crystallinity of the pigment. The resin contained in the charge-generating layer may become a trap site of charges, or prevents charges from getting into the charge-transferring layer, conductive support or undercoat layer from the charge-generating material. Therefore, in some cases, the generated charges may be recombined, which may become a factor of lowering quantum efficiency. From the view point of the electric properties of the resulting photoconductor, it is preferred that the amount of the pigment in the charge-generating layer be large, and the amount of the binder resin therein be small.

Compared to the conventional gallium phthalocyanine pigments, the novel gallium phthalocyanine compound and novel gallium phthalocyanine composite pigment of the present invention have more excellent dispersibility and dispersion stability. Therefore, the amount of the pigment used can be increased, which is one of the excellent factors of the novel compound and novel composite pigment of the present invention.

Moreover, as the novel gallium phthalocyanine compound and novel gallium phthalocyanine composite pigment of the present invention have excellent dispersion stability, the resulting charge-generating layer coating liquid has a long pot life, and thus reduction of the production cost and improvement of the quality of the resulting electrophotographic photoconductor can be realized. When a charge-generating layer is formed in the state where the charge-generating material is aggregated, the problems conventionally arise such that leaking occurs at the time of charging, or background smear appears on images formed by using the resulting photoconductor. However, since the novel gallium phthalocyanine compound and novel gallium phthalocyanine composite pigment of the present invention have excellent dispersibility and dispersion stability, the aggregations thereof are hardly formed, and thus the aforementioned conventional problem is solved by using the novel compound and composite pigment of the present invention.

The charge-generating layer is formed in the following manner. At first, the charge-generating material is dispersed in an appropriate solvent, optionally with the binder resin, by the conventional dispersing method such as using a ball-mill, an attritor, a sand-mill or ultrasonic waves, and then the resulting dispersion liquid is applied onto the conductive support, or on the undercoat layer or intermediate layer. The coated dispersion liquid is then dried to form the charge-generating layer. The addition of the binder resin may be performed either before or after the dispersion of the charge-generating material.

Examples of the solvent used for forming the charge-generating layer include commonly used organic solvents such as isopropanol, acetone, methylethyl ketone, cyclohexanone, tetrahydrofuran, dioxane, ethyl cellosolve, ethyl acetate, methyl acetate, dichloromethane, dichloroethane, monochlorobenzene, cyclohexane, toluene, xylene, and ligroin. Among them, the ketone solvent, ester solvent, and ether solvent are particularly preferable. These may be used independently, or in combination.

The coating liquid for forming the charge-generating layer contains the charge-generating material, the solvent, and the binder resin as main components, and may further contain various additives such as a sensitizing agent, a dispersing agent, a surfactant, and silicone oil.

Examples of the method for applying the coating liquid of the charge-generating layer include conventional methods such as dip coating, spray coating, bead coating, nozzle coating, spinner coating, and ring coating.

The thickness of the coated charge-generating layer is preferably 0.01 µm to 5 µm, more preferably 0.1 µm to 2 µm. After the coating, the coated film is heat dried, for example, in an oven. The drying temperature of the charge-generating layer is preferably 50° C. to 160° C.

<Charge-Transporting Layer>

The charge-transporting layer will be explained next.

The charge-transporting layer is formed by applying a coating liquid, which has been prepared by dissolving or dispersing the charge-transporting material and the binder resin in the solvent, and drying the applied coating. The coating liquid of the charge-transporting layer may optionally further contain additives such as one or more plasticizers, leveling agents, antioxidants, and lubricants.

Examples of the charge-transporting material includes poly(N-vinylcarbazole) and derivatives thereof, poly(γ-carbazolylethyl glutamate) and derivatives thereof, a pyrene-formaldehyde condensate and derivatives thereof, polyvinyl pyrene, polyvinyl phenanthrene, polysilane, oxazole derivatives, oxadiazole derivatives, imidazole derivatives, monoarylamine derivatives, diarylamine derivatives, triarylamine derivatives, stilbene derivatives, α-phenyl stilbene derivatives, amino biphenyl derivatives, benzidine derivatives, diarylmethane derivatives, triarylmethane derivatives, 9-styrylanthracene derivatives, pyrazoline derivatives, divinylbenzene derivatives, hydrazone derivatives, indene derivatives, butadiene derivatives, pyrene derivatives, bisstilbene derivatives, distyrylbenzene derivatives, and enamine derivatives. These charge-transporting materials may be used independently or in combination.

The amount of the charge-transporting material for use is generally 20 parts by mass to 300 parts by mass, and preferably 40 parts by mass to 150 parts by mass, relative to 100 parts by mass of the binder resin.

Examples of the binder resin include thermoplastic or thermoset resins such as polystyrene, styrene-acrylonitrile copolymers, styrene-butadiene copolymers, styrene-maleic anhydride copolymers, polyester, polyvinyl chloride, vinyl chloride-vinyl acetate copolymers, polyvinyl acetate, polyvinylidene chloride, polyacrylate, phenoxy resins, polycarbonate, cellulose acetate resins, ethyl cellulose resins, polyvinyl butyral, polyvinyl formal, polyvinyl toluene, poly(N-vinylcarbazole), acrylic resins, silicone resins, epoxy resins, melamine resins, urethane resins, phenol resins, and alkyd resins.

Examples of the solvent used for coating include tetrahydrofuran, dioxane, toluene, cyclohexanone, methylethyl ketone, xylene, acetone, diethyl ether, and methylethyl ketone. These may be used independently, or in combination.

The thickness of the coated charge-transporting layer is preferably 10 µm to 50 µm, more preferably 15 µm to 35 µm, in view of the obtainable dissolution and response.

The method for coating can be selected from those known in the art, such as dip coating, spray coating, bead-coating, nozzle coating, spinner coating, and ring-coating. However, since the charge-transporting layer needs to be formed to have a relatively large thickness, the method in which the highly viscous coating liquid is coated by dip coating is preferable.

After the coating, the coated film (i.e. the charge-transporting layer) is heat dried, for example, in an oven. The drying temperature may be varied depending on the solvent contained in the coating liquid, but it is preferably 80° C. to 160° C., more preferably 110° C. to 140° C. Moreover, the duration for drying is preferably 10 minutes or longer, more preferably 20 minutes or longer.

<Single Layer>

Next, the photosensitive layer having a single-layered structure will be explained.

The photosensitive layer having a single-layered structure realizes both functions of charge generation and charge transport with a single layer, by dispersing or dissolving the charge-generating material, and the charge-transporting material in the binder resin.

The photosensitive layer can be formed by dissolving or dispersing the charge-generating material, the charge-transporting material, and the binder resin in a solvent (e.g. tetrahydrofuran, dioxane, dichloroethane, methylethyl ketone, cyclohexane, cyclohexanone, toluene, and xylene), and applying the resulting coating liquid by the conventional coating method such as dip coating, spray coating, bead-coating, and ring-coating.

The charge-transporting material preferably contains both a hole-transporting material and an electron-transporting material.

Moreover, the photosensitive layer optionally contains a plasticizer, a leveling agent, an antioxidant, etc.

The charge-generating material, the charge-transporting material, the binder resin, the organic solvent, and various additive used for the single-layered photosensitive layer can be selected any of the respective materials contained in the charge-generating layer and the charge-transporting layer.

As the binder resin, those listed as the binder resin used for the charge-transporting layer may be used in combination with those listed as the binder resin used for the charge-generating layer. The amount of the charge-generating material is preferably 5 parts by mass to 40 parts by mass, more preferably 10 parts by mass to 30 parts by mass relative to 100 parts by mass of the binder resin.

Moreover, the amount of the charge-transporting material is preferably 0 part by mass to 190 parts by mass, more preferably 50 parts by mass to 150 parts by mass relative to 100 parts by mass of the binder resin. The thickness of the photosensitive layer is preferably 5 µm to 40 µm, more preferably 10 µm to 30 µm.

<Undercoat Layer>

The photoconductor of the present invention may have an undercoat layer provided between the conductive support and the photosensitive layer.

The undercoat layer generally contains a resin as a main substance. Such resin is preferably a resin having high resistance to common organic solvent, as the photosensitive layer will be provided (i.e. coated) on the undercoat layer using a solvent. Examples of such resin for use include: water-soluble resins such as polyvinyl alcohol, casein, polyacrylic acid sodium; alcohol-soluble resins such as copolymer nylon, and methoxymethylated nylon; and curable resins capable of forming three-dimensional network structures, such as polyurethane, melamine resins, phenol resins, alkyd-melamine resins, isocyanate, and epoxy resins.

Moreover, the undercoat layer may contain a powdery pigment of metal oxide such as titanium oxide, silica, alumina, zirconium oxide, tin oxide, and indium oxide for preventing formations of interference fringes, and reducing residual potential.

Moreover, the undercoat layer can be formed by the same coating methods using the same solvents as in the charge-generating layer and the charge-transporting layer. As the undercoat layer, a silane-coupling agent, a titanium-coupling agent, a chromium-coupling agent or the like can be used.

<Protective Layer>

The photoconductor of the present invention may have a protective layer provided on the outermost surface for improving abrasion resistance of the photoconductor. As the protective layer, a protective layer of a charge-transporting polymer material in which a charge-transporting component and a binder component are polymerized, a filler-dispersed protective layer in which filler is added, and a cured protective layer which has been cured have been known in the art. In the present invention, any of the protective layers known in the art can be used.

(Image Forming Device)

An image forming device of the present invention contains a charging unit, an exposing unit, a developing unit, a transferring unit, and an electrophotographic photoconductor, where the electrophotographic photoconductor is the electrophotographic photoconductor of the invention.

Moreover, the image forming device of the present invention preferably contains a main body of the device, and a process cartridge in which the electrophotographic photoconductor and at least one selected from the group consisting of a charging unit, an exposing unit, a developing unit, a transferring unit, and a cleaning unit are integratedly mounted, and the process cartridge is preferably detachably attached to the main body of the device.

Next, the electrophotographic method, and the image forming device of the present invention will be more specifically explained with reference to drawings.

Figure 5:
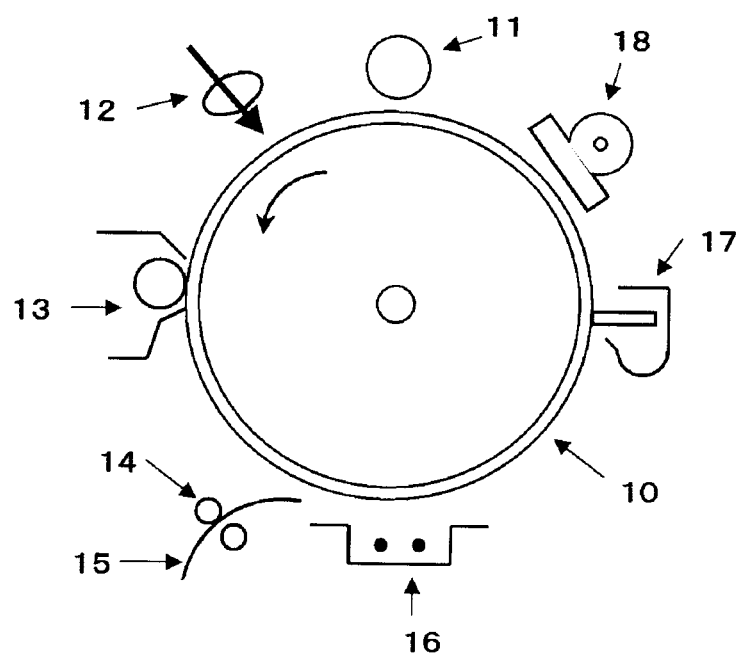
FIG. 5 is a schematic diagram for explaining one example of the electrophotographic process, and one example of the image forming device of the present invention.

FIG. 5 is a schematic diagram for explaining one example of the electrophotographic process, and image forming device of the present invention, and the following embodiment is within the scope of the present invention.

The photoconductor (10) is rotated in the direction shown with the arrow presented in FIG. 5, and adjacent to the photoconductor (10), a charging unit (11), an imagewise exposing unit (12), a developing unit (13), a transferring unit (16), a cleaning unit (17), a diselectrification unit (18) and the like are provided. There are cases where the cleaning unit (17) and/or the diselectrification unit (18) are omitted from the image forming device.

Basic operations of the image forming device are as follows.

The surface of the photoconductor (10) is uniformly charged by means of the charging unit (11), followed by performing imagewise writing corresponding to an input signal by means of the imagewise exposing unit (12) to thereby form an electrostatic latent image. Then, this electrostatic latent image is developed by means of the developing unit (13) to thereby form a toner image on the surface of the photoconductor. The formed toner image is then transferred to a transferring paper (15), which has been sent to the transferring section by conveyance rollers (14), by means of the transferring unit. This toner image is fixed on the transferring paper by means of the fixing device (not shown). The residual toner, which has not been transferred to the transferring paper, is cleaned by the cleaning unit (17). Then, the residual potential on the photoconductor is diselectrificated by means of the diselectrification unit (18) to thereby move on to a next cycle.

As shown in FIG. 5, the photoconductor (10) has a drum shape, but the photoconductor may be in the shape of a sheet, or an endless belt. As the charging unit (11), and the transferring unit (16), other than a corotron, scorotron, and a solid state charger, a roller-shaped charging unit, a brush-shaped charging unit, and the like are used, and any of the conventional charging units can be used.

As the light sources of the imagewise exposing unit (12), the dielectrification unit (18), and the like, all luminous bodies such as fluorescent lamps, tungsten lamps, halogen lamps, mercury lamps, sodium lamps, light emitting diode (LED), laser diode (LD) (i.e. a semiconductor laser), and electroluminescence (EL) can be used. Among them, the laser diode (LD) and the light emitting diode (LED) are mainly used.

Various filters may be used for applying only the light having the predetermined wavelength, and such examples of the filters include a sharp-cut filter, a band-pass filter, a near IR-cut filter, a dichroic filter, an interference filter, and a color conversion filter.

Light is applied to the photoconductor (10) by the transferring step, dielectrifying step, cleaning step or exposing step, which also perform light irradiation. However, the application of light to the photoconductor (10) in the dielectrifying step largely gives fatigue to the photoconductor (10), especially which may reduce the charge, or increase residual potential.

Therefore, it is possible to dielectrify the photoconductor by applying reverse bias in the charging step or cleaning step, not by applying light, and such method for dielectrification may be advantageous for improving the resistance of the photoconductor.

When the electrophotographic photoconductor (10) is positively (negatively) charged to perform imagewise exposure, the positive (negative) electrostatic latent image is formed on the surface of the photoconductor. If this electrolatent image is developed with a toner (voltage detecting particles) of negative polarity (positive polarity), a positive image is obtained. If the image is developed with a toner of positive polarity (negative polarity), a negative image is obtained.

Methods known in the art are used for the operations of the developing unit and the dielectrifying unit.

Among the polluting materials attached to the surface of the photoconductor, discharge materials generated by charging, external additives contained the toner, and the like are easily influenced by humidity, and are factor for causing formation of deficient images. Paper powder is also one of the factors for formation of deficient images, the attachment of the paper powder to the photoconductor causes not only formations of deficient images, but also deterioration of abrasion resistance, and partial abrasions. Therefore, the configuration that the photoconductor and the paper are not in contact with each other directly is preferable for improving the quality of the resulting images.

The toner used for developing the image on the photoconductor (10) by means of the developing unit (13) is transferred to the transferring paper (15). However, all of the toner present on the photoconductor is not transferred, and some of the toner may remain on the photoconductor (10). Such residual toner is removed from the photoconductor (10) by the cleaning unit (17).

As the cleaning unit, those known in the art, such as a cleaning blade and a cleaning brush are used. The cleaning blade and the cleaning brush are often used in combination.

Since the photoconductor of the present invention has high photosensitivity and high stability, it can be applied for a small-size photoconductor. The image forming device or its system to which such photoconductor is more effectively applied is a tandem image forming device. The tandem image forming device is equipped with a plurality of photoconductors each corresponding to respective developing units each containing a toner of respective color, and these photoconductors and the developing units are operated so as to synchronize to each other. To the tandem image forming device, at least four color toners, yellow (C), magenta (M), cyan (C), and black (K), which are necessary for full color printing, and developing units containing these toners are provided, as well as at least four photoconductors corresponding to these developing units. Having such configuration, such image forming device can realize extremely high speed printing, compared with the printing speed of conventional image forming device for full color printing.

Figure 6:
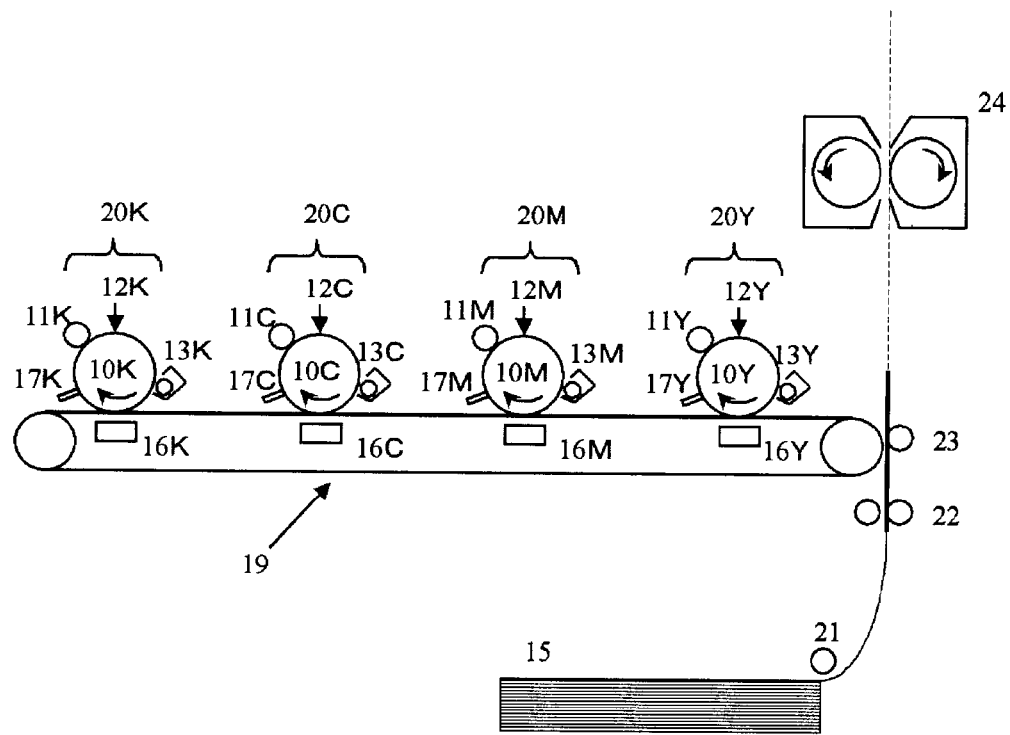
FIG. 6 is a schematic diagram for explaining another example of the electrophotographic process, and another example of the image forming device of the present invention.

FIG. 6 is a schematic diagram for explaining the full color tandem electrophotographic device (the image forming device) according to the present invention, and the example of the modification explained below is also within the scope of the present invention.

In FIG. 6, the photoconductors (10C (cyan)), (10M (magenta)), (10Y (yellow)), and (10K (black)) are each a drum-shaped photoconductor (10), and these photoconductors (10C, 10M, 10Y, and 10K) are each rotated in the direction shown with the arrow in the diagram. The adjacent to each photoconductor, at least a respective charging unit (11C, 11M, 11Y, or 11K), developing unit (13C, 13M, 13Y, or 13K), and cleaning unit (17C, 17M, 17Y, or 17K) are provided in the rotational order.

Laser light (12C, 12M, 12Y, and 12K) is applied to the photoconductors (10C, 10M, 10Y, and 10K) from the exposing units each present between the charging units (11C, 11M, 11Y, and 11K) and the developing unit (13C, 13M, 13Y, and 13K), respectively, to form electrostatic latent images on the photoconductors (10C, 10M, 10Y, and 10K), respectively.

Four image forming elements (20C, 20M, 20Y, and 20K), each of which is configured to have such photoconductor (10C, 10M, 10Y, or 10K) in center, are aligned parallel to the transferring conveyance belt (19) serving as a transferring material conveying unit.

The transferring conveyance belt (19) is provided so as to be in contact with the sections of the photoconductors (10C, 10M, 10Y, and 10K) each of which is provided in the section between the developing unit (13C, 13M, 13Y, or 13K) of each image forming element (20C, 20M, 20Y, or 20K) and the cleaning unit (17C, 17M, 17Y, or 17K), and transferring units (16C, 16M, 16Y, and 16K) for applying transferring bias are provided on the other side (the back surface) of the transferring conveyance belt (19) to the side where the photoconductors (10) are provided. The difference between the image forming elements (20C, 20M, 20Y, and 20K) is color of the toner housed in the developing unit, and other configurations are the same in the all image forming elements.

The image forming operations of the color electrophotographic device having the configurations as shown in FIG. 6 are performed in the following manner. At first, in each image forming element (20C, 20M, 20Y, or 20K), the photoconductor (10C, 10M, 10Y, or 10K) is charged by the charging unit (11C, 11M, 11Y, or 11K) which is rotated in the same direction to the rotational direction of the photoconductor (10), and electrostatic latent images, each of which is corresponded to the respective color of the image to be formed, are formed by laser light (12C, 12M, 12Y, and 12K) applied from the exposing unit (not shown) provided at outer side of the photoconductor (10).

Next, the formed electrostatic latent images are developed with the developing units (13C, 13M, 13Y, and 13K) to form toner images. The developing units (13C, 13M, 13Y, and 13K) are developing units each perform developing the toner of C (cyan), M (magenta), Y (yellow), or K (black), and the toner images each having a single color of C (cyan), M (magenta), Y (yellow), or K (black) respectively formed on the four photoconductors (10C, 10M, 10Y, and 10K) are superimposed on the transferring belt (19).

The transferring paper (15) is fed from the tray by means of the feeding roller (21), and then temporarily stopped by a pair of registration rollers (22) so that the transferring paper (15) is sent to the transferring unit (23) so as to meet the timing to the image formation on the photoconductor. The toner image held on the transferring belt (19) is transferred to the transferring paper (15) by the electric field generated by the potential difference between the transferring bias applied to the transferring unit (23) and the transferring belt (19). The toner image transferred onto the transferring paper (15) is conveyed and fixed thereon by the fixing member (24), and the transferring paper bearing the fixed image is then discharged to the discharging unit (not shown). The residual toner remained on the photoconductors (10C, 10M, 10Y, and 10K) without being transferred by the transferring unit is collected by the cleaning units (17C, 17M, 17Y, and 17K) each provided in the respective image forming element.

The intermediate transferring system as shown in FIG. 6 is particularly effective for an image forming device capable of full color printing. In this system, as a plurality of toner images are formed on an intermediate transferring member first, and then transferred to paper at the same time, it is easy to control and prevent dislocations of colors, and is advantageous for attaining high quality images. As the intermediate transferring member, intermediate transferring members of various materials and shapes, such as a drum shape and a belt shape are available. In the present invention, any of the conventional intermediate transferring members known in the art can be used, and use thereof is effective and useful for improving the durability of the photoconductor and improving the quality of the resulting images.

Note that, in the example shown with the diagram of FIG. 6, the image forming elements are aligned in the order of C (cyan), M (magenta), Y (yellow), and K (black) from the upstream to downstream in terms of the transferring paper conveying direction. However, the arrangement of the image forming elements are not necessarily limited to this order, and the order of the colors can be appropriately arranged. Moreover, it is particularly effective for the present invention to provide a mechanism that the image forming elements (20C, 20M, and 20Y) other than that of black is stopped when documents in the color of only black are formed.

The image forming unit (image forming element) as described above may be fixed and incorporated in copying devices, facsimiles, and printers, or may be incorporated therein in the form of a process cartridge.

<Process Cartridge>

The process cartridge for an image forming device of the present invention contains an electrophotographic photoconductor, and at least one selected from the group consisting of a charging unit, an exposing unit, a developing unit, a transferring unit, and a cleaning unit, where the electrophotographic photoconductor and the aforementioned at least one member are integrated to form the process cartridge, and the electrophotographic photoconductor is the electrophotographic photoconductor of the present invention.

Figure 7:
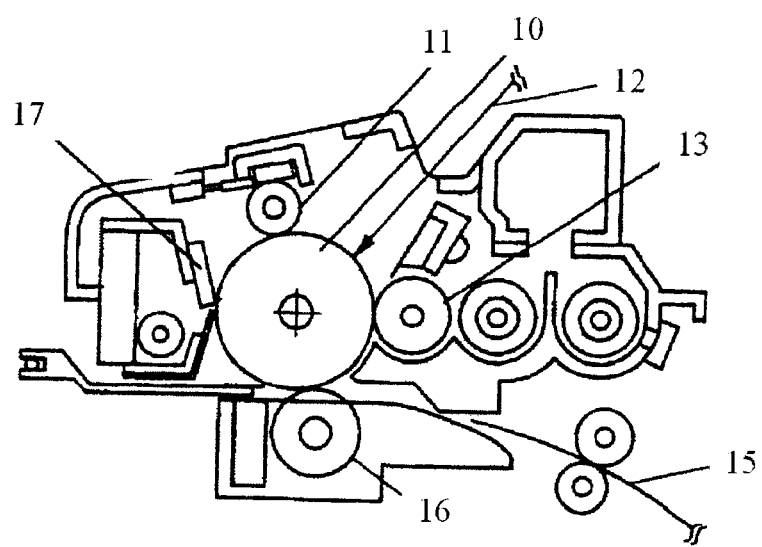
FIG. 7 is a schematic diagram for explaining one example of the process cartridge for an image forming device of the present invention.

The process cartridge is, for example, a device (a component) equipped with the photoconductor (10), and containing, other than the photoconductor (10), the charging unit (11), imagewise exposing unit (12), developing unit (13), transferring unit (16), cleaning unit (17), and diselectrification unit, as shown in FIG. 7.

The aforementioned tandem image forming device can realize high speed full color printing because it can transfer a plurality of toner images at once.

However, the conventional tandem image forming device still has many problems to be solved. For example, the tandem image forming device requires at least four photoconductors, and thus the size of the device naturally becomes large. In addition, if the amount of each toner used is varied, each photoconductor has a different amount of abrasion depending on the amount of the toner used, which may reduce color reproduction ability, or may form deficient images.

Comparing to the above, the photoconductor of the present invention can be applied as a small diameter photoconductor because the photoconductor of the present invention realizes high photosensitivity and high stability. Since the photoconductor of the present invention reduces adverse phenomena such as increased residual potential and deterioration of sensitivity, the difference formed in the residual potential or sensitivity among the four photoconductors over time is small even though the abrasion amounts of the four photoconductors are different to each other, and thus full color images having excellent color reproduction ability can be attained after repetitive use for a long period of time.

EXAMPLE

The present invention will be explained with Synthesis Examples and Examples thereof hereinafter, but these examples shall not be construed as limiting the scope of the present invention. Note that, "part(s)" means "part(s) by mass" in the descriptions hereinafter.

Synthesis Example (1) Synthesis of Chlorogallium Phthalocyanine

To 200 g of dehydrated dimethylsulfoxide, 30 parts of 1,3-diiminoisoindoline, and 8 parts by mass of gallium trichloride were added, the mixture was allowed to react for 12 hours under flow of Ar at 150° C., and then the generated chlorogallium phthalocyanine was separated by filtration. After washing the resulting wet cake with methylethyl ketone and N,N-dimethylformamide, the washed wet cake was dried to thereby yield 22 parts (70.3% by mass) of chlorogallium phthalocyanine crystals.

(2) Synthesis of Hydroxygallium Phthalocyanine

The obtained chlorogallium phthalocyanine (5 parts) was made dissolved in 150 parts of ice-cold concentrated sulfuric acid, and this sulfuric acid solution was gradually dropped in 500 g of ice-cold ion-exchanged water to thereby precipitate crystals of hydroxygallium phthalocyanine. After separating the crystals by filtration, the wet cake was washed with 500 g of 2% by mass ammonium water, followed by sufficiently washing with ion-exchanged water. Thereafter, the washed wet cake was dried to thereby yield 4.6 parts of Hydroxygallium Phthalocyanine Crystal A.

Synthesis Example 1

Synthesis Example of Gallium Phthalocyanine Compound Expressed by General Formula (I) (R1 to R32 are all Hydrogen Atoms)

To 100 g of N,N-dimethylformamide, 2.9 parts of sulfuric acid, and 0.90 parts of Hydroxygallium Phthalocyanine Crystal A were added, and the mixture was heated at 120° C. and allowed to react for 7 hours. Thereafter, the reaction mixture was cooled down to room temperature, and the thus generated crystals were removed by filtration. To the obtained crystal, 100 g of N,N-dimethylformamide was added, and the mixture was stirred for 2 hours at room temperature, followed by removing the crystals by filtration. This operation was repeated again, and then the same operation was carried out, provided that the solvent was changed to 2-butanone. Furthermore, the same operation was performed twice with about 100 g of ion-exchanged water, followed by drying to thereby obtain 0.84 parts (89%) of a gallium phthalocyanine compound.

Figure 8:
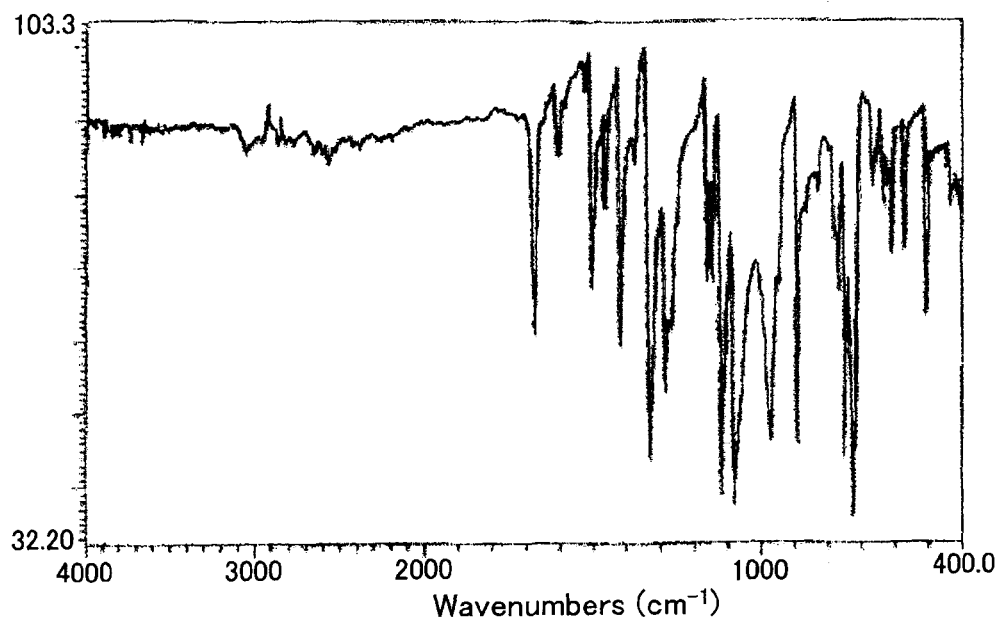
FIG. 8 is a diagram showing an infrared absorption spectrum (The KBr pellet technique) of Synthesis Example 1.

The obtained compound was subjected to infrared absorption spectroscopy (The KBr pellet technique). The result is shown in FIG. 8.

As a result, it was confirmed that the absorption (3,500 cm$^{-1}$) originated from the hydroxyl group of the raw material was disappeared, and the absorption (1,678 cm$^{-1}$) based on the stretching vibration of C=O was present. This showed that the obtained compound included in its crystals N,N-dimethylformamide used as the solvent.

The analysis was performed by LDI-TOF MS (negative ion mode), and the signal at m/z: 1,258.4 (theoretical value corresponding to $C_{64}H_{32}Ga_2N_{16}O_4S$ being 1,258.1) was observed. Moreover, the result of the elemental analysis of the compound is shown in Table 1 below.

TABLE 1

|  | C | H | N | S |
|---|---|---|---|---|
| Calculated value (%) | 60.98 | 2.56 | 17.78 | 2.54 |
| Measured value (%) | 59.6 | 2.9 | 17.4 | 2.4 |

The measured values from the elemental analysis, especially of the carbon element content (C), are outside an error range, but it is assumed that as analyzed in the result of the infrared absorption spectroscopy N,N-dimethylacetoamide was trapped in the crystal of the obtained compound.

From these results, it was conformed that the obtained compound was a gallium phthalocyanine compound expressed by the general formula (I) (R1 to R32 are all hydrogen atoms).

Figure 9:
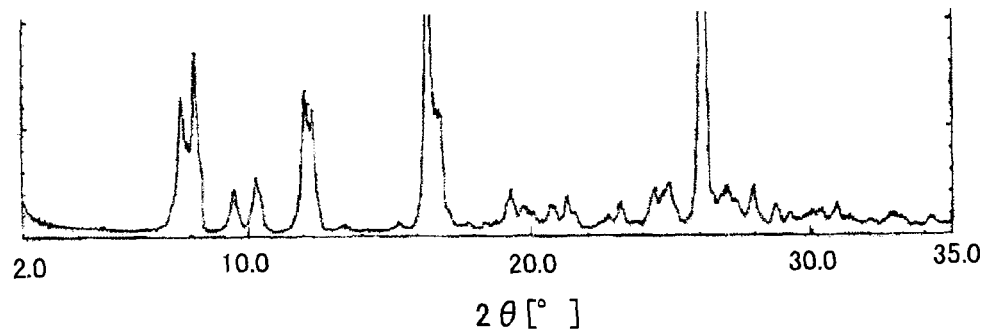
FIG. 9 is a diagram showing a powder X-ray diffraction spectrum of Synthesis Example 1.

The powder X-ray diffraction spectrum of the obtained gallium phthalocyanine compound is shown in FIG. 9.

Synthesis Example 2

Synthesis Example of Gallium Phthalocyanine Compound Expressed by General Formula (I) (R1 to R32 are all Hydrogen Atoms)

Figure 10:
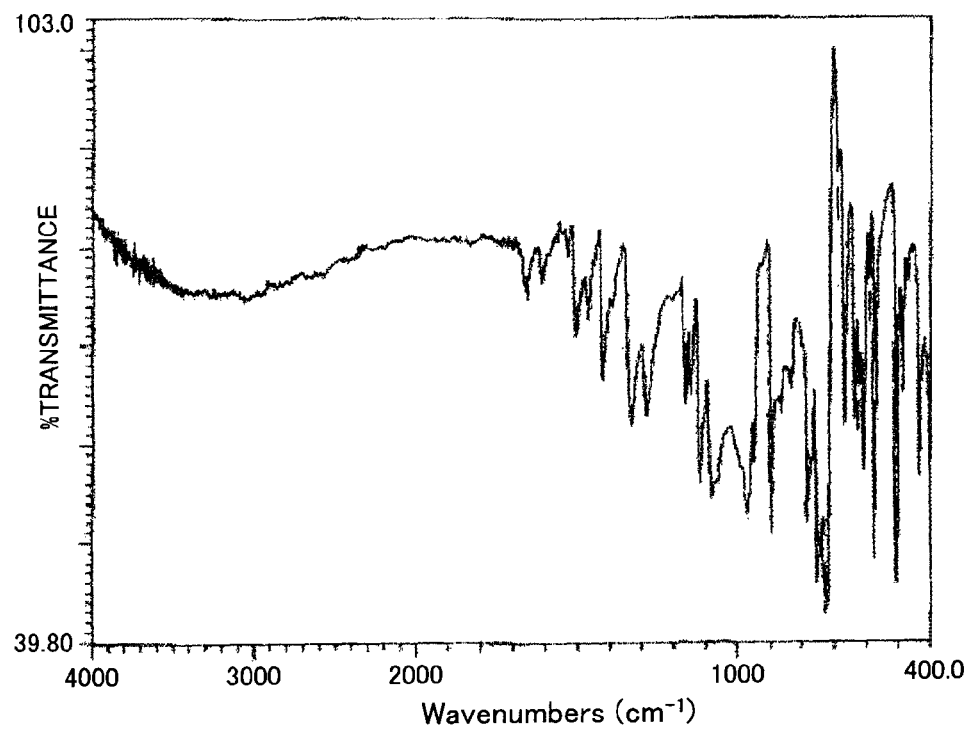
FIG. 10 is a diagram showing an infrared absorption spectrum (The KBr pellet technique) of Synthesis Example 2.

The same reaction was performed as in Synthesis Example 1, provided that N,N-dimethylformamide was changed to N,N-dimethylacetoamide. Then, after cooling the reaction mixture to room temperature, crystals were removed by filtration. To the obtained crystals, 100 g of 2-butanone was added, the mixture was stirred for 2 hours at room temperature, and then the crystals were removed by filtration. This operation was repeated once again, and the same operation was performed twice with about 100 g of ion-exchanged water, followed by drying, to thereby obtain 0.65 parts (69%) of a gallium phthalocyanine compound.
The obtained compound was subjected to infrared absorption spectroscopy (The KBr pellet technique). The result is shown in FIG. 10.

As a result, it was confirmed that the absorption (3,500 cm$^{-1}$) originated from the hydroxyl group of the raw material was disappeared, and the absorption (1,655 cm$^{-1}$) based on the stretching vibration of C=O was present. This showed that the obtained compound included in its crystals N,N-dimethylformamide used as the solvent.

The analysis was performed by LDI-TOF MS (negative ion mode), and the signal at m/z: 1,258.2 (theoretical value corresponding to $C_{64}H_{32}Ga_2N_{16}O_4S$ being 1,258.1) was observed. Moreover, the result of the elemental analysis of the compound is shown in Table 2 below.

TABLE 2

|  | C | H | N | S |
|---|---|---|---|---|
| Calculated value (%) | 60.98 | 2.56 | 17.78 | 2.54 |
| Measured value (%) | 60.3 | 2.8 | 17.3 | 2.3 |

The measured values from the elemental analysis, especially of the carbon element content (C), are outside an error range, but it is assumed that as analyzed in the result of the infrared absorption spectroscopy N,N-dimethylacetoamide was trapped in the crystal of the obtained compound.

From these results, it was conformed that the obtained compound was the gallium phthalocyanine compound expressed by the general formula (I) (R1 to R32 are all hydrogen atoms).

Figure 11:
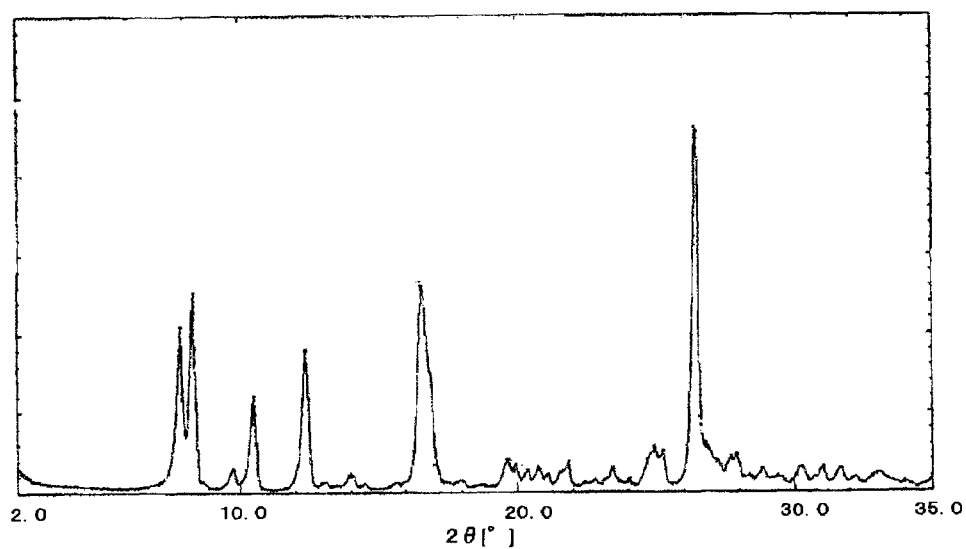
FIG. 11 is a diagram showing a powder X-ray diffraction spectrum of Synthesis Example 2.

The powder X-ray diffraction spectrum of this compound is shown in FIG. 11.

Synthesis Example 3

Synthesis Example of Gallium Phthalocyanine Compound Expressed by General Formula (I) (R1 to R32 are all Hydrogen Atoms)

To 60 g of dimethylsulfoxide, 3.9 parts of sulfuric acid, and 1.20 parts of Hydroxygallium Phthalocyanine Crystal A were added, and the mixture was heated at 100° C. and allowed to react for 2 hours. Thereafter, the reaction mixture was cooled down to room temperature, and about 60 g of ion-exchanged water was further added to the mixture, followed by stirring for 2 hours at room temperature. The thus generated crystals were removed by filtration. To the obtained crystal, about 100 g of ion-exchanged water was added, and the mixture was stirred for 2 hours at room temperature, followed by removing the crystals by filtration. This operation was repeated 4 times, followed by drying to thereby obtain 1.12 parts (89%) of a gallium phthalocyanine compound.

Figure 12:
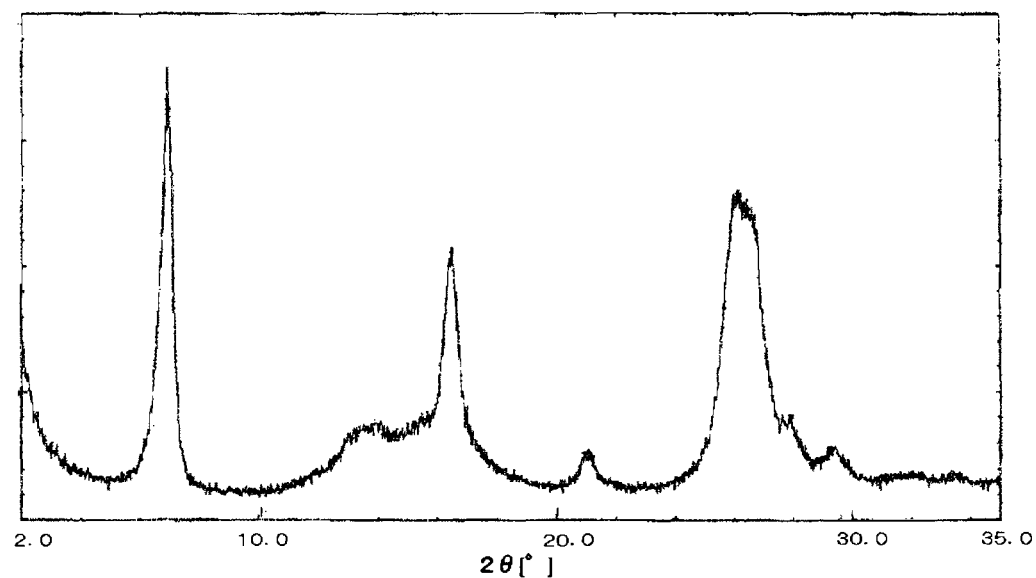
FIG. 12 is a diagram showing a powder X-ray diffraction spectrum of Synthesis Example 3.

The powder X-ray diffraction spectrum of the obtained gallium phthalocyanine compound is shown in FIG. 12.

The obtained compound (0.5 parts) was added to 50 g of N,N-dimethylformamide, and the mixture was maintained for 4.5 hours under return current, cooled down to room temperature to generate crystals, and filtered to remove the crystals. To the obtained crystals, 100 g of 2-butanone was added, and the mixture was stirred for 2 hours at room temperature, followed by removing the crystal by filtration. The same operation was carried out twice, provided that the solvent was changed to about 100 g of ion-exchanged water, followed by drying.

The obtained compound was subjected to infrared absorption spectroscopy (The KBr pellet technique). It was confirmed that the result was identical to that of Synthesis Example 1 shown in FIG. 8.

Based on this result, it was confirmed that the obtained compound was the gallium phthalocyanine compound expressed by the general formula (I) (R1 to R32 are all hydrogen atoms).

Figure 13:
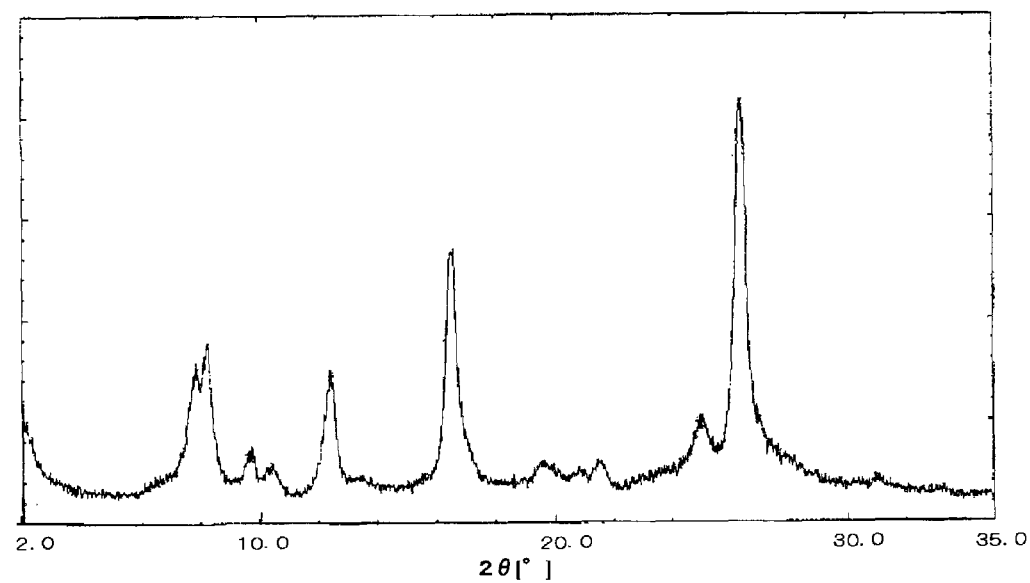
FIG. 13 is another diagram showing a powder X-ray diffraction spectrum of Synthesis Example 3.

The powder X-ray diffraction spectrum of this compound is shown in FIG. 13.

Synthesis Example 4

Synthesis Example of Gallium Phthalocyanine Compound Expressed by General Formula (I) (R1 to R32 are all Hydrogen Atoms)

To a mixed solvent of chlorobenzene (100 g) and tetrahydrofurane (30 g), 9.8 parts of sulfuric acid, and 0.90 parts of Hydroxygallium Phthalocyanine Crystal A were added, and the mixture was heated at 100° C. and allowed to react for 2 hours. Thereafter, the reaction mixture was cooled down to room temperature, and the thus generated crystals were removed by filtration. To the obtained crystal, 100 g of 2-butanone was added, and the mixture was stirred for 2 hours at room temperature, followed by removing the crystals by filtration. This operation was repeated again, and then the same operation was carried out, provided that the solvent was changed to tetrahydrofuran. Furthermore, the same operation was performed twice with about 100 g of ion-exchanged water, followed by drying to thereby obtain 0.87 parts (92%) of a gallium phthalocyanine compound.

Figure 14:
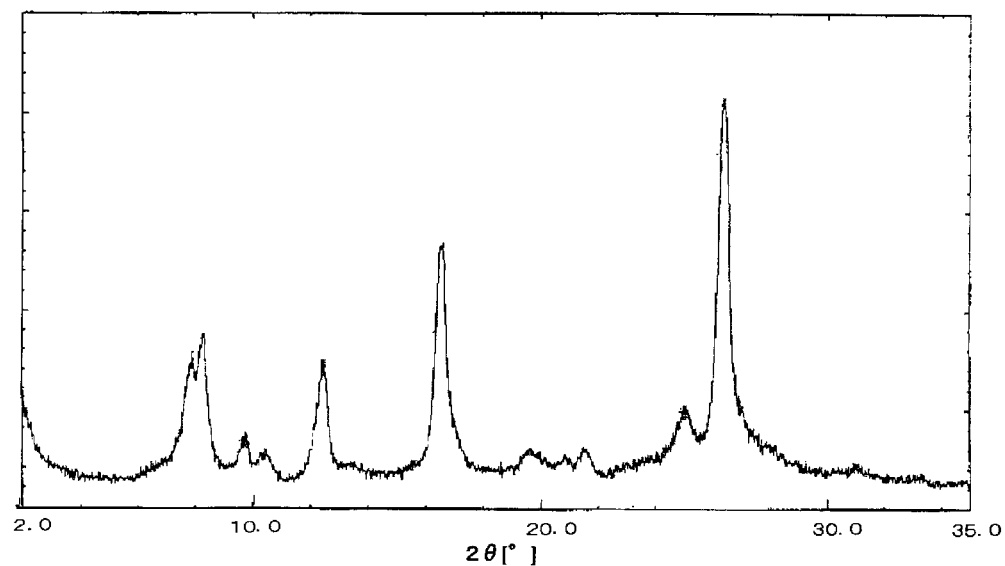
FIG. 14 is a diagram showing a powder X-ray diffraction spectrum of Synthesis Example 4.

The powder X-ray diffraction spectrum of the obtained compound is shown in FIG. 14.

Into a 50-mL sample glass bottle, 0.5 parts of the obtained compound, and 15 g of N,N-dimethylformamide were added together with 45 parts of glass beads (diameter: about 1 mm), the mixture was milled for 24 hours, followed by removing the crystals by filtration. To the obtained crystals, 100 g of 2-butanone was added, and the mixture was stirred for 2 hours at room temperature, followed by removing the crystals by filtration. The same operation was performed twice, provided that the solvent was changed to about 100 g of ion-exchanged water, followed by drying.

The obtained compound was subjected to infrared absorption spectroscopy (The KBr pellet technique). It was confirmed that the result was identical to that of Synthesis Example 1 shown in FIG. 8.

Based on this result, it was confirmed that the obtained compound was the gallium phthalocyanine compound expressed by the general formula (I) (R1 to R32 are all hydrogen atoms).

Figure 15:
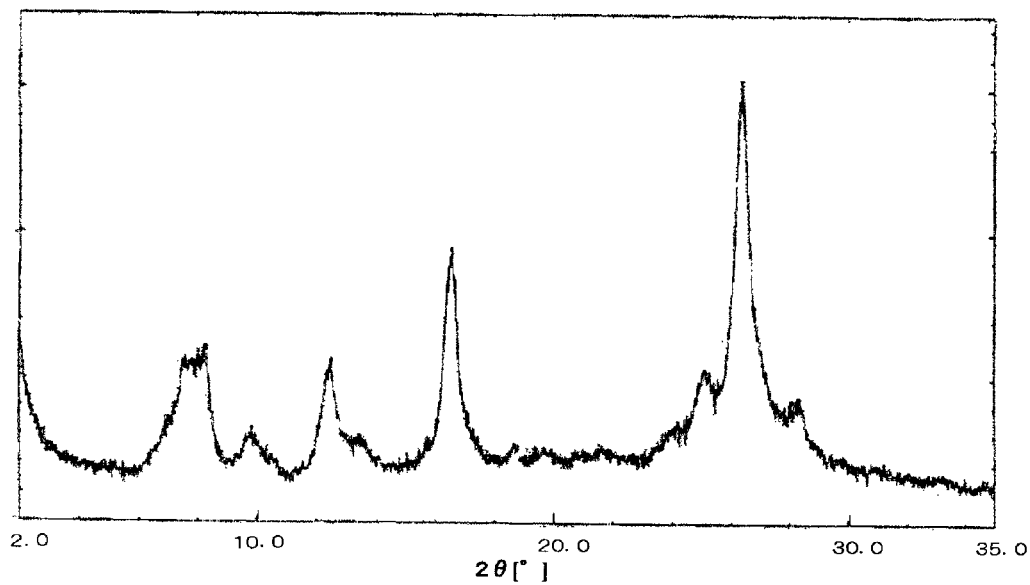
FIG. 15 is another diagram showing a powder X-ray diffraction spectrum of Synthesis Example 4.

The powder X-ray diffraction spectrum of the obtained compound is shown in FIG. 15.

Comparative Synthesis Example 1

Synthesis of Hydroxygallium Phthalocyanine

Into a 50-mL glass sample bottle, 0.5 parts of Hydroxygallium Phthalocyanine Crystal A, and 15 g of N,N-dimethylformamide were added together with 45 parts of glass beads (diameter: about 1 mm), the mixture was milled for 24 hours, followed by removing the crystals by filtration. To the obtained crystals, 100 g of 2-butanone was added, and the mixture was stirred for 2 hours at room temperature, followed by removing the crystals by filtration. The same operation was performed twice, provided that the solvent was changed to about 100 g of ion-exchanged water, followed by drying, to thereby obtain Hydroxygallium Phthalocyanine Crystal B.

Figure 16:
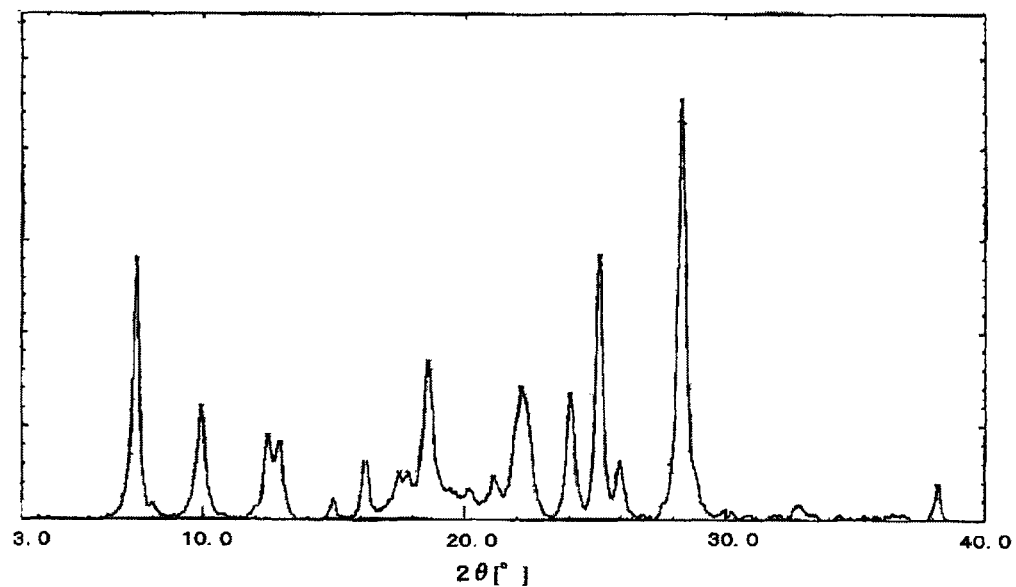
FIG. 16 is a diagram showing a powder X-ray diffraction spectrum of Comparative Synthesis Example 1.

The powder X-ray diffraction spectrum of Hydroxygallium Phthalocyanine Crystal B is shown in FIG. 16.

Example 1

Example of Electrophotographic Photoconductor

Onto an aluminum cylinder (diameter: 100 mm, length: 360 mm) serving as a conductive support, the undercoat layer coating liquid of the formulation presented below, the charge-generating layer coating liquid of the formulation presented below, and the charge-transporting layer coating liquid of the formulation presented below were sequentially applied by dip coating, followed by drying, so that an undercoat layer having a thickness of about 3.5 μm, and a charge-transporting layer having a thickness of about 28 μm were formed to thereby prepare a laminate photoconductor. Moreover, the charge-generating layer coating liquid was prepared by dispersing using a bead-mill (zirconium beads, having a diameter of 0.5 mm, rotor revolution number being 3,000 rpm, dispersed for 2 hours), and the prepared coating liquid was applied the following day from the day prepared. A thickness of a charge-generating layer was adjusted so that the charge-generating layer would have transmittance of 10% to light of 780 nm. The transmittance of the charge-generating layer was evaluated by applying the charge-generating layer coating liquid of the formulation presented below onto an aluminum cylinder around which a polyethylene terephthalate film was wound in the same coating manner as in the preparation of the photoconductor, and measuring the transmittance thereof at 780 nm by means of the commercially available spectrophotometer (Shimadzu Corporation: UV-3600) using, as a comparison sample, a polyethylene terephthalate film to which the charge-generating layer coating liquid was not provided. Note that, the charge-generating layer coating liquid was prepared by dispersing components thereof by a bead mill. After coating each layer and setting to touch, the undercoat layer was dried for 20 minutes at 130° C., the charge-generating layer was dried for 20 minutes at 100° C., and the charge-transporting layer was dried for 20 minutes at 130° C. Thereafter, onto the charge-transporting layer, the protective layer coating liquid of the formulation presented below was applied by spray coating, and the coated film was crosslinked by applying light thereto using a metal halide lamp (160 W/cm) at the radiation intensity of 500 mW/cm$^2$, for 60 seconds. Thereafter, the crosslinked film was heated and dried for 20 minutes at 130° C. so as to form a protective layer having a thickness of 5 μm to thereby obtain Electrophotographic Photoconductor 1.

-Undercoat Layer Coating Liquid-

| | |
|---|---|
| Titanium oxide, CR-EL (manufactured by Ishihara Sangyo Kaisha, Ltd.) | 50 parts |
| Alkyd resins, BECKOLITE M6401-50 (solid content: 50% by mass, manufactured by DIC Corporation) | 14 parts |
| Melamine resin, L-145-60 (solid content: 60% by mass, manufactured by DIC Corporation) | 8 parts |
| 2-butanone | 120 parts |

-Charge-Generating Layer Coating Liquid-

| | |
|---|---|
| Gallium phthalocyanine compound synthesized in Synthesis Example 1 (Compound having the X-ray diffraction spectrum pattern of FIG. 9) | 10 parts |
| Polyvinyl butyral resin BX-1 (manufactured by Sekisui Chemical Co., Ltd.) | 10 parts |
| MEK | 600 parts |

-Charge-Transporting Layer Coating Liquid-

| Bisphenol-Z polycarbonate (PANLITE TS-2050, manufactured by Teijin Chemicals Ltd.) | 10 parts |
|---|---|
| Charge-transporting material expressed by the following structural formula (1) | 7 parts |
| Tetrahydrofuran | 80 parts |
| 1%-Silicone oil tetrahydrofuran solution (KF50-1CS, manufactured by Shin-Etsu Chemical Co., Ltd.) | 0.2 parts |

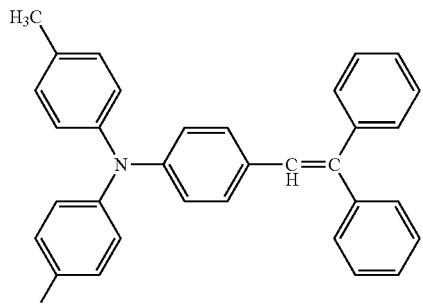

Structural Formula (1)

-Protective Layer Coating Liquid-

| Tri- or higher polyfunctional radical polymerizable monomer having no charge-transporting structure [trimethylolpropane triacrylate] (KAYARAD TMPTA, manufactured by Nippon Kayaku Co., Ltd., molecular weight: 296, number of functional groups: 3, molecular weight/number of functional group = 99) | 10 parts |
|---|---|
| Radical polymerizable compound having a monofunctional charge-transporting structure expressed by the following structural formula (2) | 10 parts |

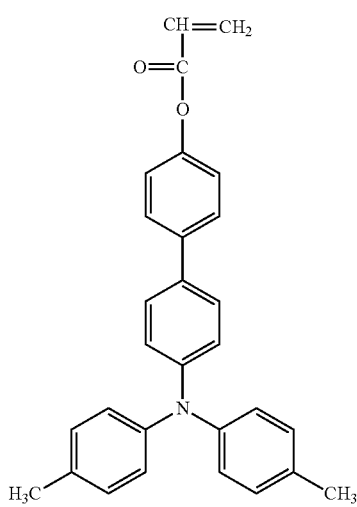

Structural Formula (2)

| Photopolymerization initiator (1-hydroxy cyclohexyl phenyl ketone; IRGACURE184, manufactured by Ciba Specialty Chemicals Corporation) | 1 part |
|---|---|
| Tetrahydrofuran | 100 parts |

Example 2

Electrophotographic Photoconductor 2 was prepared in the same manner as in Example 1, provided that the gallium phthalocyanine compound used in Example 1 was changed to the gallium phthalocyanine compound (the compound having the X-ray diffraction pattern of FIG. 15) synthesized in Synthesis Example 4.

Example 3

Electrophotographic Photoconductor 3 was prepared in the same manner as in Example 1, provided that the charge-generating layer coating liquid was replaced with the one below, and the duration for the bead-mill dispersion was changed from 2 hours to 4 hours.

<Charge-Generating Layer Coating Liquid>

| Gallium phthalocyanine compound synthesized in Synthesis Example 1 (Compound having the X-ray diffraction spectrum pattern of FIG. 9) | 5 parts |
|---|---|
| Hydroxygallium phthalocyanine compound synthesized in Comparative Synthesis Example 1 (Compound having the X-ray diffraction spectrum pattern of FIG. 16) | 5 parts |
| Polyvinyl butyral resin BX-1 (manufactured by Sekisui Chemical Co., Ltd.) | 10 part |
| MEK | 600 parts |

Example 4

Electrophotographic Photoconductor 4 was prepared in the same manner as in Example 1, provided that the charge-generating layer coating liquid prepared by the bead-mill dispersion was left to stand for one month, then applied to form the charge-generating layer.

Comparative Example 1

Electrophotographic Photoconductor 5 was prepared in the same manner as in Example 3, provided that the charge-generating layer coating liquid prepared by the bead-mill dispersion was left to stand for one month, then applied to form the charge-generating layer.

<Evaluation Using Actual Device>

A paper running test on an actual device was performed as follows. Specifically, the aforementioned electrophotographic photoconductor was mounted to an electrophotographic process cartridge, and a modified device of IMAGIO Neo 751 manufactured by Ricoh Company Limited (linear velocity of photoconductor: 350 mm/sec., wavelength of LD exposure light: 780 nm) was used as an image forming device, and a paper running test was performed by this image forming device on 50,000 pieces of paper. As the paper for the test, A4, MyPaper manufactured by Ricoh Business Expert, Ltd. was used. As the process conditions during the test, the voltage applied to the charging unit was adjusted so that the unexposed area of the photoconductor would have the surface potential of −800V. The developing bias was adjusted to −500V. The printing conditions were such that a chart having 6% of writing ratio (characters were evenly written, and the imaging area of the characters is 6% relative to the entire area of A4) was used and the same image was printed on 50,000 pieces of paper. Note that, the test was performed in the environment of normal temperature and normal humidity. The evaluation was performed on the surface potential of the dark area and bright area of the photoconductor, and image quality of the resulting print at the initial stage of the test, and after printing 50,000 pieces. The surface potential was measured by attaching, to the developing unit, a potentiometer probe connected to a surface potential meter so as to be 50 mm above from the outermost surface of the photoconductor, mounting the photoconductor in such device, adjusting the grid potential so that the dark area of the photoconductor had the surface potential of −800(V), and outputting a black solid image. As the surface potentiometer, MODEL 344 Electrostatic Voltmeter, manufactured by TREK Japan Co., Ltd., was used. The image quality was evaluated based on the following evaluation criteria. The results are shown in Table 3.

A: There is hardly any reduction in image quality.
B: Reduction in image quality can be observed visually.
C: There is a significant problem in image quality.

TABLE 3

| | | Initial stage | | | After 50,000 prints | | |
|---|---|---|---|---|---|---|---|
| Example | Photo-conductor | Potential in a dark area [−V] | Potential in a light area [−V] | Image quality | Potential in a dark area [−V] | Potential in a light area [−V] | Image quality |
| Ex. 1 | P1 | 800 | 200 | A | 790 | 210 | A |
| Ex. 2 | P2 | 800 | 210 | A | 780 | 230 | A |
| Ex. 3 | P3 | 800 | 200 | A | 780 | 220 | A |
| Ex. 4 | P4 | 800 | 200 | A | 780 | 215 | A |
| Comp. Ex. 1 | P5 | 800 | 210 | B Scumming | 780 | 250 | C Scumming |

Note that, in Table 3, P1 to P5 respectively denote Photoconductor 1 to Photoconductor 5.

Synthesis Example 5

Synthesis of Gallium Phthalocyanine Composite Pigment 1 of Gallium Phthalocyanine Compound Expressed by General Formula (I) (R1 to R32 are all Hydrogen Atoms) and Azo Compound Expressed by General Formula (12-2) (E=H)

To 100 g of N,N-dimethylformamide, 2.9 parts of sulfuric acid, 0.91 parts of the azo compound (i.e. the azo compound expressed by the general formula (12-2), $E:C_5H_9O_2$) which had been prepared in the method described in Example 3 of JP-A No. 2009-7523, and 0.90 parts of Hydroxygallium Phthalocyanine Crystal B were added, and the mixture was heated at 120° C. and was allowed to react for 5 hours. The reaction mixture was then cooled down to room temperature, and the generated crystals were removed by filtration. To the obtained crystals, 100 g of N,N-dimethylformamide was added, and the mixture was stirred for 2 hours at room temperature, followed by removing the crystals by filtration. This operation was repeated once, then the same operation was carried out provided that the solvent was changed to 2-butanone. Furthermore, the same operation was carried out 5 times with about 100 g of ion-exchanged water as a solvent, followed by drying to thereby obtain 1.36 parts (88%) of Gallium Phthalocyanine Composite Pigment 1.

It was confirmed that the absorption derived from the saturated hydrocarbon (2,980 cm$^{-1}$) of the azo compound, the absorption based on the stretching vibration of C=O of the carbonate (1760 cm$^{-1}$) of the azo compound, and the absorption derived from the hydroxyl group (around 3,500 cm$^{-1}$) of hydroxygallium phthalocyanine were disappeared on the IR absorption spectrum (the KBr pellet technique) of Gallium Phthalocyanine Composite Pigment 1.

Figure 17:
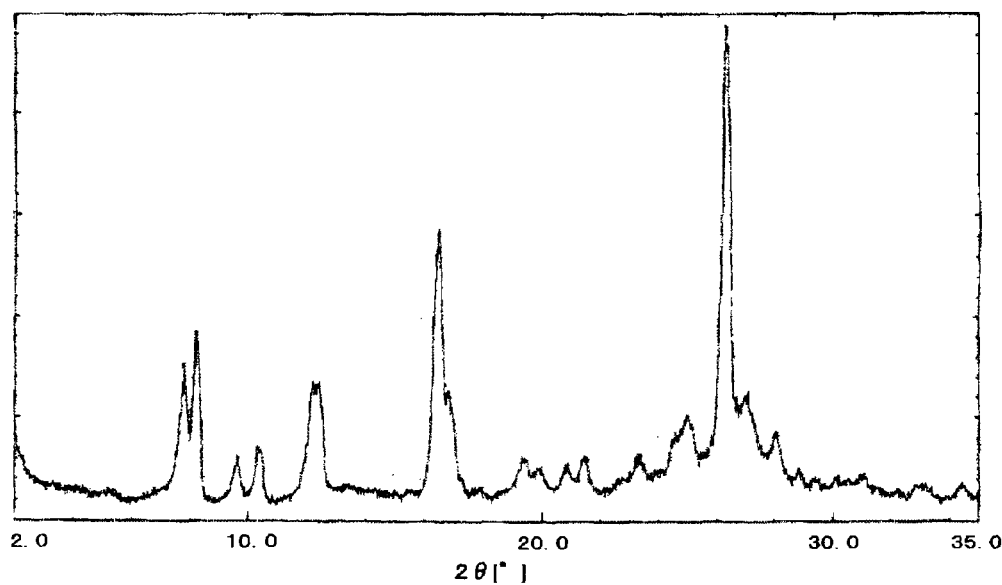
FIG. 17 is a diagram showing a powder X-ray diffraction spectrum of Synthesis Example 5.

Based on this result, it was confirmed that the obtained compound was targeted Gallium Phthalocyanine Composite Pigment 1. The powder X-ray diffraction spectrum of Gallium Phthalocyanine Composite Pigment 1 is shown in FIG. 17.

Synthesis Example 6

Synthesis of Gallium Phthalocyanine Composite Pigment 2 of Gallium Phthalocyanine Compound Expressed by General Formula (I) (R1 to R32 are all Hydrogen Atoms) and Azo Compound Expressed by General Formula (12-2) (E=H)

To 100 g of N,N-dimethylformamide, 7.4 parts of sulfuric acid, 0.36 parts of the azo compound (i.e. the azo compound expressed by the general formula (12-2), $E:C_5H_9O_2$) which had been prepared in the method described in Example 3 of JP-A No. 2009-7523, and 0.90 parts of Hydroxygallium Phthalocyanine Crystal A were added, and the mixture was heated at 100° C. and was allowed to react for 7 hours. The reaction mixture was then cooled down to room temperature, and the generated crystals were removed by filtration. To the obtained crystals, 100 g of N,N-dimethylformamide was added, and the mixture was stirred for 2 hours at room temperature, followed by removing the crystals by filtration. This operation was repeated once, then the same operation was carried out provided that the solvent was changed to 2-butanone. Furthermore, the same operation was carried out 4 times with about 100 g of ion-exchanged water as a solvent, followed by drying to thereby obtain 0.83 parts (70%) of Gallium Phthalocyanine Composite Pigment 2.

It was confirmed that the absorption derived from the saturated hydrocarbon (2,980 cm$^{-1}$) of the azo compound, the absorption based on the stretching vibration of C=O of the carbonate (1760 cm$^{-1}$) of the azo compound, and the absorption derived from the hydroxyl group (around 3,500 cm$^{-1}$) of hydroxygallium phthalocyanine were disappeared on the IR absorption spectrum (the KBr pellet technique) of Gallium Phthalocyanine Composite Pigment 2.

Figure 18:
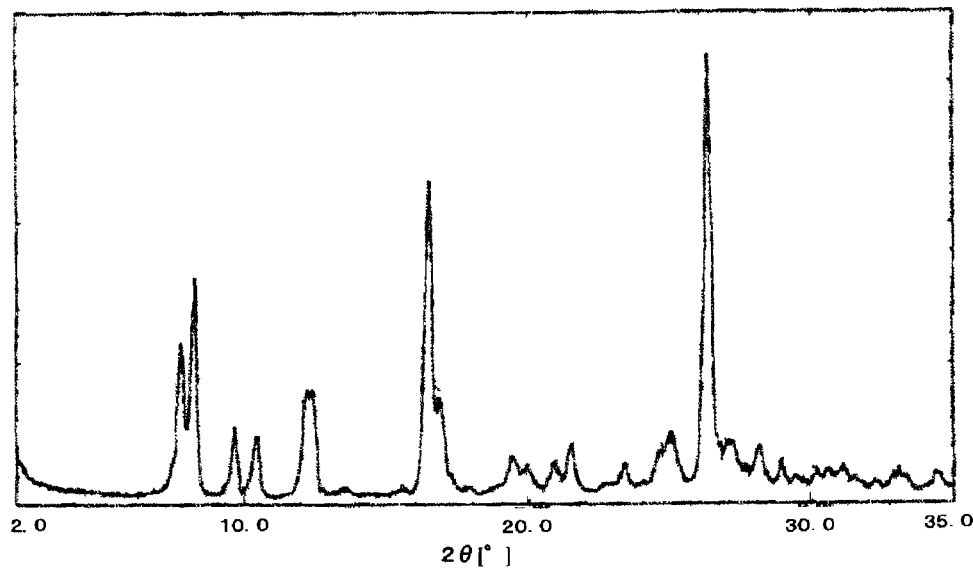
FIG. 18 is a diagram showing a powder X-ray diffraction spectrum of Synthesis Example 6.

Based on this result, it was confirmed that the obtained compound was targeted Gallium Phthalocyanine Composite Pigment 2. The powder X-ray diffraction spectrum of Gallium Phthalocyanine Composite Pigment 2 is shown in FIG. 18.

Synthesis Example 7

Synthesis of Gallium Phthalocyanine Composite Pigment 3 of Gallium Phthalocyanine Compound Expressed by General Formula (I) (R1 to R32 are all Hydrogen Atoms) and Azo Compound Expressed by General Formula (12-3) (E=H)

To 100 g of N,N-dimethylformamide, 5.8 parts of sulfuric acid, 1.84 parts of the azo compound (i.e. the azo compound expressed by the general formula (12-3), $E:C_5H_9O_2$) which had been prepared in the method described in Example 3 of JP-A No. 2009-7523, and 0.90 parts of Hydroxygallium Phthalocyanine Crystal A were added, and the mixture was heated at 130° C. and was allowed to react for 9 hours. The reaction mixture was then cooled down to room temperature, and the generated crystals were removed by filtration. To the obtained crystals, 100 g of N,N-dimethylformamide was added, and the mixture was stirred for 2 hours at room temperature, followed by removing the crystals by filtration. This operation was repeated once, then the same operation was carried out provided that the solvent was changed to 2-butanone. Furthermore, the same operation was carried out 5 times with about 100 g of ion-exchanged water as a solvent, followed by drying to thereby obtain 1.98 parts (91%) of Gallium Phthalocyanine Composite Pigment 3.

It was confirmed that the absorption derived from the saturated hydrocarbon (2,980 cm$^{-1}$) of the azo compound, the absorption based on the stretching vibration of C=O of the carbonate (1760 cm$^{-1}$) of the azo compound, and the absorption derived from the hydroxyl group (around 3,500 cm$^{-1}$) of hydroxygallium phthalocyanine were disappeared on the IR absorption spectrum (the KBr pellet technique) of Gallium Phthalocyanine Composite Pigment 3.

Figure 19:
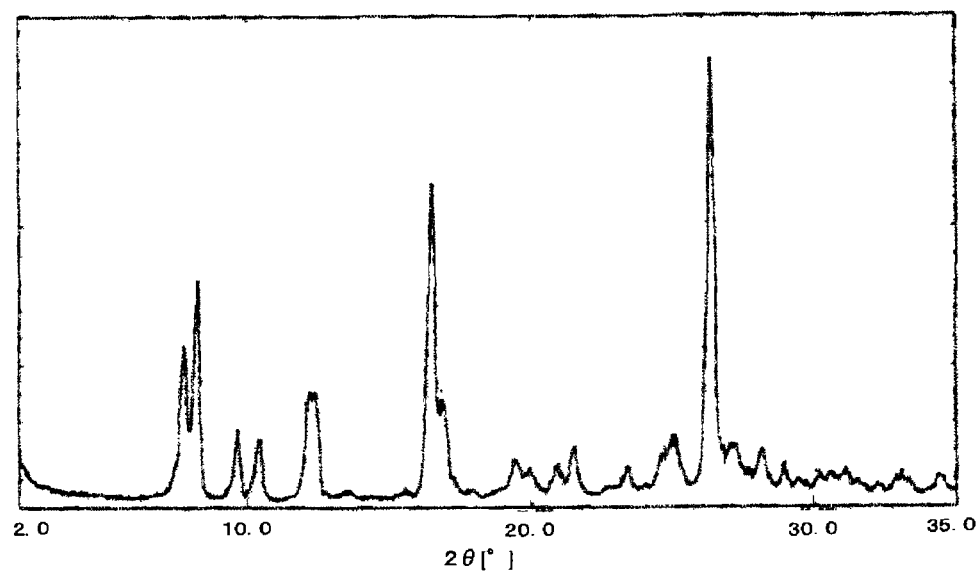
FIG. 19 is a diagram showing a powder X-ray diffraction spectrum of Synthesis Example 7.

Based on this result, it was confirmed that the obtained compound was targeted Gallium Phthalocyanine Composite Pigment 3. The powder X-ray diffraction spectrum of Gallium Phthalocyanine Composite Pigment 3 is shown in FIG. 19.

Synthesis Example 8

Synthesis of Gallium Phthalocyanine Composite Pigment 4 of Gallium Phthalocyanine Compound Expressed by General Formula (I) (R1 to R32 are all Hydrogen Atoms) and Azo Compound Expressed by General Formula (12-4) (E=H)
Synthesis of Gallium Phthalocyanine Compound Expressed by General Formula (I) (R1 to R32 are all Hydrogen Atoms)

To 100 g of N,N-dimethylformamide, 2.9 parts of sulfuric acid and 0.90 parts of Hydroxygallium Phthalocyanine Crystal B obtained in Comparative Synthesis Example 1 were added, and the mixture was heated at 120° C. and was allowed to react for 7 hours. The reaction mixture was cooled down to room temperature, and the generated crystals were removed by filtration. To the obtained crystals, 100 g of N,N-dimethylformamide was added, and the mixture was stirred for 2 hours at room temperature, followed by removing the crystals by filtration. This operation was repeated once, and then the same operation was carried out provided that the solvent was changed to 2-butanone. In addition, the same operation was carried out twice with about 100 g of ion-exchanged water as a solvent, followed by drying to thereby obtain 0.84 parts (89%) of a gallium phthalocyanine compound.

It was confirmed that the absorption (3,500 cm$^{-1}$) originated from the hydroxyl group of the raw material was disappeared, and the absorption (1,678 cm$^{-1}$) based on the stretching vibration of C=O was present on the IR absorption spectrum (the KBr pellet technique) of the obtained compound. This showed that the obtained compound included in its crystals N,N-dimethylformamide used as the solvent.

The analysis was performed by LDI-TOF MS (negative ion mode), and the signal at m/z: 1,258.4 (theoretical value corresponding to $C_{64}H_{32}Ga_2N_{16}O_4S$ being 1,258.1) was observed. Moreover, the result of the elemental analysis of the compound is shown in Table 4 below.

TABLE 4

|  | C | H | N | S |
|---|---|---|---|---|
| Calculated value (%) | 60.98 | 2.56 | 17.78 | 2.54 |
| Measured value (%) | 59.6 | 2.9 | 17.4 | 2.4 |

The measured values from the elemental analysis, especially of the carbon element content (C), are outside an error range, but it is assumed that as analyzed in the result of the infrared absorption spectroscopy N,N-dimethylacetoamide was trapped in the crystal of the obtained compound.

From these results, it was conformed that the obtained compound was a gallium phthalocyanine compound expressed by the general formula (I) (R1 to R32 are all hydrogen atoms).

Synthesis of Gallium Phthalocyanine Composite Pigment of Gallium Phthalocyanine Compound and Azo Compound To 100 g of N,N-dimethylformamide, 0.90 parts of the above-obtained gallium phthalocyanine compound expressed by the general formula (I) (R1 to R32 are all hydrogen atoms) and 0.89 parts of the azo compound (the azo compound expressed by the above-presented formula (12-4), E:$C_5H_9O_2$) which had been prepared in the method described in Synthesis Example 2 of JP-A No. 2009-7523 were added and the mixture was allowed to react for 7 hours under return current, while strongly stirring. After confirming the disappearance of the azo compound (the azo compound expressed by the above-presented formula (12-4), E:$C_5H_9O_2$) by thin layer chromatography, the temperature of the mixture was returned to room temperature, and filtered through a fluoropore having a pore diameter of 0.1 μm.

To the obtained crystals, 100 g of N,N-dimethylformamide was added, and the mixture was stirred for 2 hours at room temperature, followed by removing the crystals by filtration. This operation was repeated once, and then the same operation was carried out provided that the solvent was changed to 2-butanone. Moreover, the same operation was carried out twice with about 100 g of ion-exchanged water as a solvent, followed by drying to thereby obtain 1.25 parts (84%) of Gallium Phthalocyanine Composite Pigment 4.

It was confirmed that the absorption derived from the saturated hydrocarbon (2,980 cm$^{-1}$) of the azo compound and the absorption based on the stretching vibration of C=O of the carbonate (1760 cm$^{-1}$) of the azo compound were disappeared on the IR absorption spectrum (the KBr pellet technique) of Gallium Phthalocyanine Composite Pigment 4.

Synthesis Example 9

Synthesis of Gallium Phthalocyanine Composite Pigment 5 of Gallium Phthalocyanine Compound Expressed by General Formula (I) (R1 to R32 are all Hydrogen Atoms) and Azo Compound Expressed by General Formula (13-1) (E=H)

To 100 g of o-xylene, 0.90 parts of the gallium phthalocyanine compound expressed by the general formula (I) obtained in Synthesis Example 8, 1.01 parts of the azo compound (the azo compound expressed by the above-presented formula (13-1), E:$C_5H_9O_2$) which had been prepared in the method described in Example 7 of JP-A No. 2009-7523, 1.0 part of trifluoroacetic acid were added and the mixture was allowed to react for 4 hours under return current, while strongly stirring. After confirming the disappearance of the azo compound (the azo compound expressed by the above-presented formula (13-1), E:$C_5H_9O_2$) by thin layer chromatography, the temperature of the mixture was returned to room temperature, and filtered through a fluoropore having a pore diameter of 0.1 µm.

To the obtained crystals, 100 g of N,N-dimethylformamide was added, and the mixture was stirred for 2 hours at room temperature, followed by removing the crystals by filtration. This operation was repeated twice, and then the same operation was carried out provided that the solvent was changed to 2-butanone. Moreover, the same operation was carried out twice with about 100 g of ion-exchanged water as a solvent, followed by drying to thereby obtain 1.48 parts (92%) of Gallium Phthalocyanine Composite Pigment 5.

It was confirmed that the absorption derived from the saturated hydrocarbon (2,980 $cm^{-1}$) of the azo compound and the absorption based on the stretching vibration of C=O of the carbonate (1760 $cm^{-1}$) of the azo compound were disappeared on the IR absorption spectrum (the KBr pellet technique) of Gallium Phthalocyanine Composite Pigment 5.

Synthesis Example 10

Synthesis of Gallium Phthalocyanine Composite Pigment 6 of Gallium Phthalocyanine Compound Expressed by General Formula (I) (R1 to R32 are all Hydrogen Atoms) and Azo Compound Expressed by General Formula (12-2) (E=H)

To 150 g of 2-butanone, 6.0 parts of sulfuric acid, 1.82 parts of the azo compound (i.e. the azo compound expressed by the general formula (12-2), E:$C_5H_9O_2$) which had been prepared in the method described in Example 3 of JP-A No. 2009-7523, and 0.90 parts of Hydroxygallium Phthalocyanine Crystal A were added, and the mixture was heated and allowed to react for 10 hours. The reaction mixture was then cooled down to room temperature, and the generated crystals were removed by filtration. To the obtained crystals, 150 g of 2-butanone was added, and the mixture was stirred for 2 hours at room temperature, followed by removing the crystals by filtration. This operation was repeated once, and then the same operation was carried out 5 times provided that the solvent was changed to about 100 g of ion-exchanged water, followed by drying to thereby obtain 1.98 parts (92%) of Gallium Phthalocyanine Composite Pigment 6.

It was confirmed that the absorption derived from the saturated hydrocarbon (2,980 $cm^{-1}$) of the azo compound, the absorption based on the stretching vibration of C=O of the carbonate (1760 $cm^{-1}$) of the azo compound, and the absorption derived from the hydroxyl group (around 3,500 $cm^{-1}$) of hydroxygallium phthalocyanine were disappeared on the IR absorption spectrum (the KBr pellet technique) of Gallium Phthalocyanine Composite Pigment 6.

Figure 20:
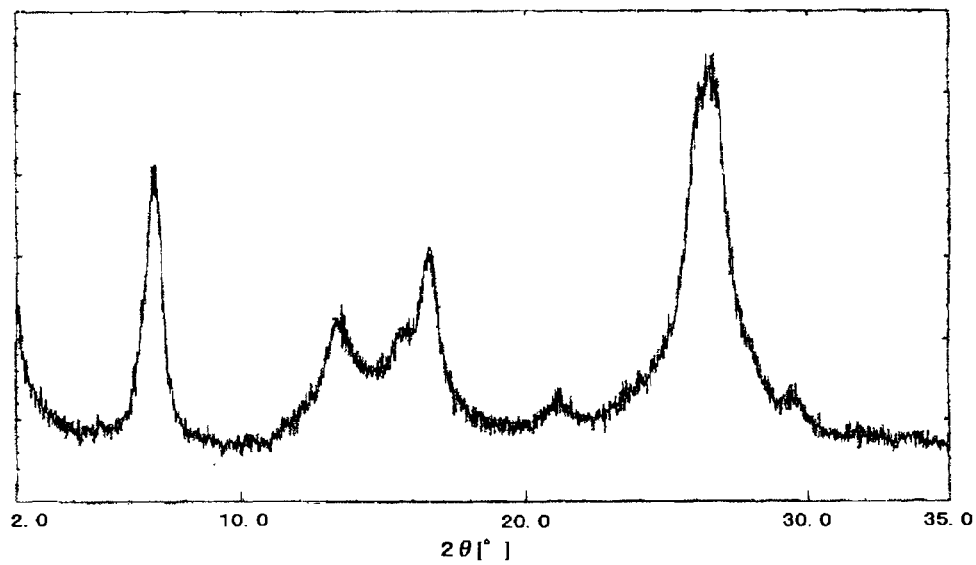
FIG. 20 is a diagram showing a powder X-ray diffraction spectrum of Synthesis Example 10.

Based on this result, it was confirmed that the obtained compound was targeted Gallium Phthalocyanine Composite Pigment 6. The powder X-ray diffraction spectrum of Gallium Phthalocyanine Composite Pigment 6 is shown in FIG. 20.

Figure 21:
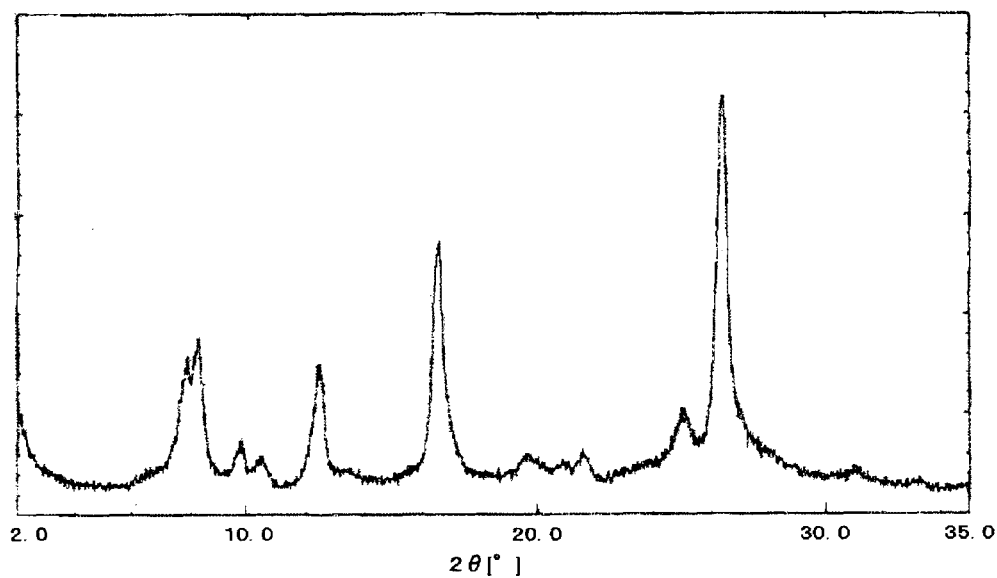
FIG. 21 is another diagram showing a powder X-ray diffraction spectrum of Synthesis Example 10.

Into a 50-mL glass sample bottle, 0.5 parts of Gallium Phthalocyanine Composite Pigment 6, and 15 g of N,N-dimethylformamide were added together with 45 parts of glass beads (diameter: about 1 mm), the mixture was milled for 24 hours, followed by removing the crystals by filtration. To the obtained crystals, 100 g of 2-butanone was added, and the mixture was stirred for 2 hours at room temperature, followed by removing the crystals by filtration. The same operation was performed twice, provided that the solvent was changed to about 100 g of ion-exchanged water, followed by drying. The powder X-ray diffraction spectrum of the resulted pigment is shown in FIG. 21.

Example 5

Example of Electrophotographic Photoconductor

Onto an aluminum cylinder (diameter: 100 mm, length: 360 mm) serving as a conductive support, the undercoat layer coating liquid of the formulation presented below, the charge-generating layer coating liquid of the formulation presented below, and the charge-transporting layer coating liquid of the formulation presented below were sequentially applied by dip coating, followed by drying, so that an undercoat layer having a thickness of about 3.5 µm, and a charge-transporting layer having a thickness of about 28 µm were formed to thereby prepare a laminate photoconductor. Moreover, the charge-generating layer coating liquid was prepared by dispersing using a bead-mill (zirconium beads, having a diameter of 0.5 mm, rotor revolution number being 3,000 rpm, dispersed for 2 hours), and the prepared coating liquid was applied the following day from the day prepared. A thickness of a charge-generating layer was adjusted so that the charge-generating layer would have transmittance of 10% to light of 780 nm. The transmittance of the charge-generating layer was evaluated by applying the charge-generating layer coating liquid of the formulation presented below onto an aluminum cylinder around which a polyethylene terephthalate film was wound in the same coating manner as in the preparation of the photoconductor, and measuring the transmittance thereof at 780 nm by means of the commercially available spectrophotometer (Shimadzu Corporation: UV-3600) using, as a comparison sample, a polyethylene terephthalate film to which the charge-generating layer coating liquid was not provided. Note that, the charge-generating layer coating liquid was prepared by dispersing components thereof by a bead mill. After coating each layer and setting to touch, the undercoat layer was dried for 20 minutes at 130° C., the charge-generating layer was dried for 20 minutes at 100° C., and the charge-transporting layer was dried for 20 minutes at 130° C. Thereafter, onto the charge-transporting layer, the protective layer coating liquid of the formulation presented below was applied by spray coating, and the coated film was crosslinked by applying light thereto using a metal halide lamp (160 W/cm) at the radiation intensity of 500 mW/$cm^2$, for 60 seconds. Thereafter, the crosslinked film was heated and dried for 20 minutes at 130° C. so as to form a protective layer having a thickness of 5 µm to thereby obtain Electrophotographic Photoconductor 6.

-Undercoat Layer Coating Liquid-

| | |
|---|---|
| Titanium oxide, CR-EL (manufactured by Ishihara Sangyo Kaisha, Ltd.) | 50 parts |
| Alkyd resins, BECKOLITE M6401-50 (solid content: 50% by mass, manufactured by DIC Corporation) | 14 parts |
| Melamine resin, L-145-60 (solid content: 60% by mass, manufactured by DIC Corporation) | 8 parts |
| 2-butanone | 120 parts |

-Charge-Generating Layer Coating Liquid-

| | |
|---|---|
| Gallium Phthalocyanine Composite Pigment 1 synthesized in Synthesis Example 5 | 10 parts |
| Polyvinyl butyral resin BX-1 (manufactured by Sekisui Chemical Co., Ltd.) | 10 parts |
| MEK (methylethyl ketone) | 600 parts |

-Charge-Transporting Layer Coating Liquid-

| | |
|---|---|
| Bisphenol-Z polycarbonate (PANLITE TS-2050, manufactured by Teijin Chemicals Ltd.) | 10 parts |
| Charge-transporting material expressed by the following structural formula (15) | 7 parts |
| Tetrahydrofuran | 80 parts |
| 1%-Silicone oil tetrahydrofuran solution (KF50-1CS, manufactured by Shin-Etsu Chemical Co., Ltd.) | 0.2 parts |

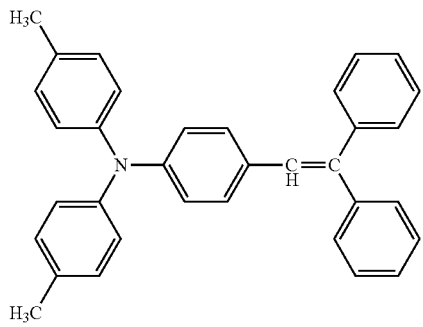

Structural Formula (15)

-Protective Layer Coating Liquid)-

| | |
|---|---|
| Tri- or higher polyfunctional radical polymerizable monomer having no charge-transporting structure [trimethylolpropane triacrylate] (KAYARAD TMPTA, manufactured by Nippon Kayaku Co., Ltd., molecular weight: 296, number of functional groups: 3, molecular weight/number of functional group = 99) | 10 parts |
| Radical polymerizable compound having a monofunctional charge-transporting structure expressed by the following structural formula (16) | 10 parts |
| Photopolymerization initiator (1-hydroxy cyclohexyl phenyl ketone; IRGACURE184, manufactured by Ciba Specialty Chemicals Corporation) | 1 part |
| Tetrahydrofuran | 100 parts |

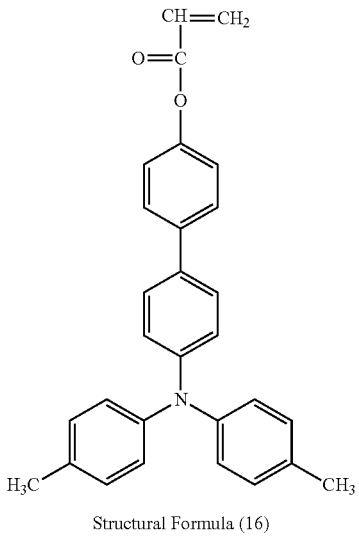

Structural Formula (16)

Example 6

Electrophotographic Photoconductor 7 was prepared in the same manner as in Example 5, provided that Gallium Phthalocyanine Composite Pigment 1 contained in the charge-generating layer coating liquid was changed to Gallium Phthalocyanine Composite Pigment 2.

Example 7

Electrophotographic Photoconductor 8 was prepared in the same manner as in Example 5, provided that Gallium Phthalocyanine Composite Pigment 1 contained in the charge-generating layer coating liquid was changed to Gallium Phthalocyanine Composite Pigment 3.

Example 8

Electrophotographic Photoconductor 9 was prepared in the same manner as in Example 5, provided that Gallium Phthalocyanine Composite Pigment 1 contained in the charge-generating layer coating liquid was changed to Gallium Phthalocyanine Composite Pigment 4.

Example 9

Electrophotographic Photoconductor 10 was prepared in the same manner as in Example 5, provided that Gallium Phthalocyanine Composite Pigment 1 contained in the charge-generating layer coating liquid was changed to Gallium Phthalocyanine Composite Pigment 5.

Example 10

Electrophotographic Photoconductor 11 was prepared in the same manner as in Example 5, provided that Gallium Phthalocyanine Composite Pigment 1 contained in the charge-generating layer coating liquid was changed to Gallium Phthalocyanine Composite Pigment 6.

Comparative Example 2

Electrophotographic Photoconductor 12 was prepared in the same manner as in Example 5, provided that Gallium Phthalocyanine Composite Pigment 1 contained in the charge-generating layer coating liquid was changed to the gallium phthalocyanine compound expressed by the general formula (I) (R1 to R32 are all hydrogen atoms) synthesized in Synthesis Example 8.

Comparative Example 3

Electrophotographic Photoconductor 13 was prepared in the same manner as in Example 5, provided that the charge-generating layer coating liquid was changed to the one below.
<Charge-Generating Layer Coating Liquid>

| | |
|---|---|
| Gallium phthalocyanine compound expressed by the general formula (I) (R1 to R32 are all hydrogen atoms) of Synthesis Example 8 | 5 parts |
| Azo pigment (E = H) expressed by the general formula ((12-2)) | 5 parts |
| Polyvinyl butyral resin BX-1 (Sekisui Chemical Co., Ltd.) | 10 parts |
| MEK (methylethyl ketone) | 600 parts |

Comparative Example 4

Electrophotographic Photoconductor 14 was prepared in the same manner as in Example 5, provided that the charge-generating layer coating liquid was changed to the one below.
<Charge-Generating Layer Coating Liquid>

| | |
|---|---|
| Gallium phthalocyanine compound expressed by the general formula (I) (R1 to R32 are all hydrogen atoms) of Synthesis Example 8 | 5 parts |
| Azo pigment (E = H) expressed by the general formula ((12-3)) | 5 parts |
| Polyvinyl butyral resin BX-1 (Sekisui Chemical Co., Ltd.) | 10 parts |
| MEK (methylethyl ketone) | 600 parts |

Comparative Example 5

Electrophotographic Photoconductor 15 was prepared in the same manner as in Example 5, provided that the charge-generating layer coating liquid was changed to the one below.
<Charge-Generating Layer Coating Liquid>

| | |
|---|---|
| Gallium phthalocyanine compound expressed by the general formula (I) (R1 to R32 are all hydrogen atoms) of Synthesis Example 8 | 5 parts |
| Azo pigment (E = H) expressed by the general formula ((12-4)) | 5 parts |
| Polyvinyl butyral resin BX-1 (Sekisui Chemical Co., Ltd.) | 10 parts |
| MEK (methylethyl ketone) | 600 parts |

Comparative Example 6

Electrophotographic Photoconductor 16 was prepared in the same manner as in Example 5, provided that the charge-generating layer coating liquid was changed to the one below.
<Charge-Generating Layer Coating Liquid>

| | |
|---|---|
| Gallium phthalocyanine compound expressed by the general formula (I) (R1 to R32 are all hydrogen atoms) of Synthesis Example 8 | 5 parts |
| Azo pigment (E = H) expressed by the general formula ((13-1)) | 5 parts |
| Polyvinyl butyral resin BX-1 (Sekisui Chemical Co., Ltd.) | 10 parts |
| MEK (methylethyl ketone) | 600 parts |

<Evaluation Using Actual Device>

A paper running test on an actual device was performed as follows. Specifically, the aforementioned electrophotographic photoconductor was mounted to an electrophotographic process cartridge, and a modified device of IMAGIO Neo 751 manufactured by Ricoh Company Limited (linear velocity of photoconductor: 350 mm/sec., wavelength of LD exposure light: 780 nm) was used as an image forming device, and a paper running test was performed by this image forming device on 300,000 pieces of paper. As the paper for the test, A4, MyPaper manufactured by Ricoh Business Expert, Ltd. was used. As the process conditions during the test, the voltage applied to the charging unit was adjusted so that the unexposed area of the photoconductor would have the surface potential of −800V. The developing bias was adjusted to −500V. The printing conditions were such that a chart having 6% of writing ratio (characters were evenly written, and the imaging area of the characters is 6% relative to the entire area of A4) was used and the same image was printed on 300,000 pieces of paper. Note that, the test was performed in the environment of normal temperature and normal humidity. The evaluation was performed on the surface potential of the dark area and bright area of the photoconductor, and image quality of the resulting print at the initial stage of the test, and after printing 300,000 pieces. The surface potential was measured by attaching, to the developing unit, a potentiometer probe connected to a surface potential meter so as to be 50 mm above from the outermost surface of the photoconductor, mounting the photoconductor in such device, adjusting the grid potential so that the dark area of the photoconductor had the surface potential of −800(V), and outputting a black solid image. As the surface potentiometer, MODEL 344 Electrostatic Voltmeter, manufactured by TREK Japan Co., Ltd., was used. The image quality was evaluated based on the following evaluation criteria. The results are shown in Table 5.

A: There is hardly any reduction in image quality.

B: Reduction in image quality can be observed visually.

C: There is a significant problem in image quality.

TABLE 5

| Ex./Comp. Ex. | Photo-conductor | Initial Stage | | | After 50,000 prints | | | After 300,000 prints | | |
|---|---|---|---|---|---|---|---|---|---|---|
| | | Potential in dark area [−V] | Potential in light area [−V] | Image quality | Potential in dark area [−V] | Potential in light area [−V] | Image quality | Potential in dark area [−V] | Potential in light area [−V] | Image quality |
| Ex. 5 | P6 | 800 | 140 | A | 795 | 145 | A | 770 | 200 | A |
| Ex. 6 | P7 | 800 | 160 | A | 795 | 165 | A | 780 | 210 | A |
| Ex. 7 | P8 | 800 | 160 | A | 790 | 170 | A | 765 | 220 | A |
| Ex. 8 | P9 | 800 | 150 | A | 795 | 155 | A | 770 | 215 | A |
| Ex. 9 | P10 | 800 | 180 | A | 795 | 190 | A | 775 | 230 | A |
| Ex. 10 | P11 | 800 | 150 | A | 795 | 155 | A | 770 | 190 | A |
| Comp. Ex. 2 | P12 | 800 | 200 | A | 790 | 210 | A | 700 | 290 | C |
| Comp. Ex. 3 | P13 | 800 | 190 | A | 770 | 200 | A | 680 | 270 | C |
| Comp. Ex. 4 | P14 | 800 | 200 | A | 780 | 220 | A | 675 | 280 | C |
| Comp. Ex. 5 | P15 | 800 | 195 | A | 775 | 205 | A | 680 | 290 | C |
| Comp. Ex. 6 | P16 | 800 | 210 | A | 765 | 230 | A | 660 | 290 | C |

Note that, in Table 5, P6 to P16 respectively denote Photoconductor 6 to Photoconductor 16.

What is claimed is:

1. A gallium phthalocyanine compound, which is expressed by the following general formula (I):

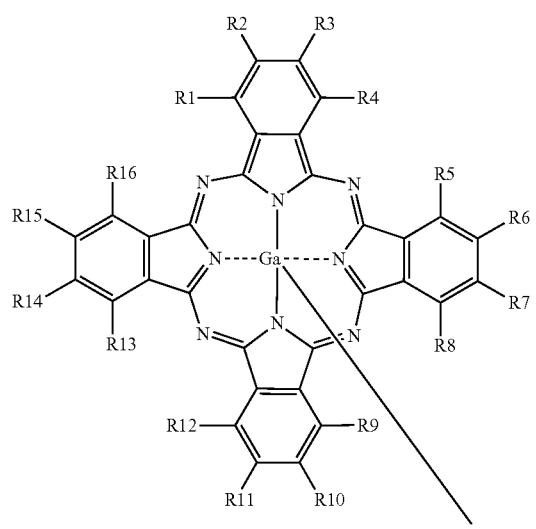
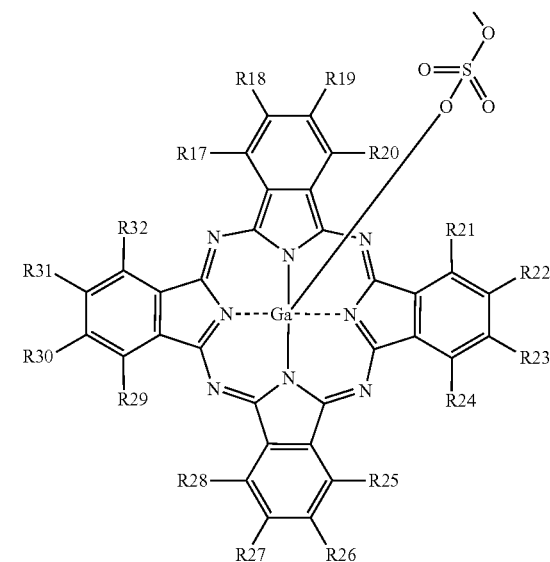

General Formula (I)

where R1 to R32 are each independently a hydrogen atom, an alkoxy group, an alkylthio group, an alkyl group, a halogen atom, a nitro group, or an aryl group.

2. The gallium phthalocyanine compound according to claim 1, wherein the gallium phthalocyanine compound has a diffraction peak at 26.4° to a CuKα X-ray radiation having a wavelength of 0.1541 nm, with Bragg angle being 2θ±0.3°.

3. The gallium phthalocyanine compound according to claim 2, wherein the diffraction peak at 26.4° to a CuKα X-ray radiation having a wavelength of 0.1541 nm with Bragg angle of 2θ±0.3° is the highest peak among peaks present in the range of 2° to 35°.

4. An electrophotographic photoconductor, comprising:

a conductive support; and a photosensitive layer disposed on the conductive support, and containing a gallium phthalocyanine compound according to claim 1, wherein the gallium phthalocyanine compound is expressed by the following general formula (I):

General Formula (I)

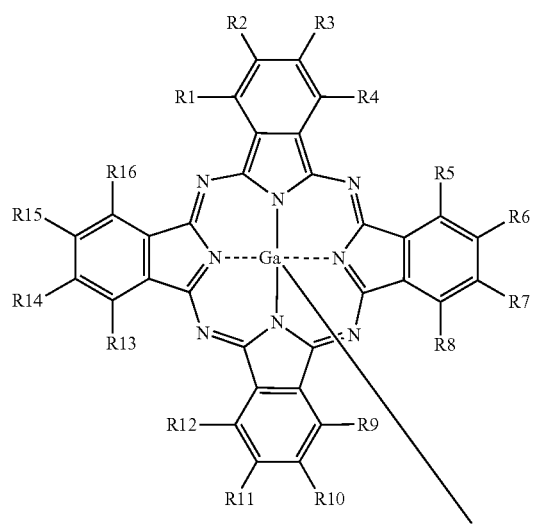

-continued

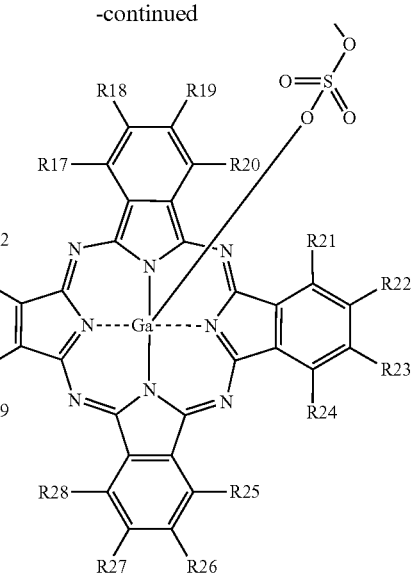

where R1 to R32 are each independently a hydrogen atom, an alkoxy group, an alkylthio group, an alkyl group, a halogen atom, a nitro group, or an aryl group.

5. The electrophotographic photoconductor according to claim 4, wherein the gallium phthalocyanine compound has a diffraction peak at 26.4° to a CuKα X-ray radiation having a wavelength of 0.1541 nm, with Bragg angle being 2θ±0.3°.

6. The electrophotographic photoconductor according to claim 5, wherein the diffraction peak at 26.4° to a CuKα X-ray radiation having a wavelength of 0.1541 nm with Bragg angle of 2θ±0.3° is the highest peak among peaks present in the range of 2° to 35°.

* * * * *